US010976529B2

(12) United States Patent
Shimada et al.

(10) Patent No.: US 10,976,529 B2
(45) Date of Patent: Apr. 13, 2021

(54) VARIABLE MAGNIFICATION OPTICAL SYSTEM AND OPTICAL APPARATUS

(71) Applicant: FUJIFILM Corporation, Tokyo (JP)

(72) Inventors: Yasutaka Shimada, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 16/133,511

(22) Filed: Sep. 17, 2018

(65) Prior Publication Data
US 2019/0094505 A1 Mar. 28, 2019

(30) Foreign Application Priority Data

Sep. 27, 2017 (JP) .............................. JP2017-185649

(51) Int. Cl.
*G02B 15/14* (2006.01)
*G02B 15/16* (2006.01)
(Continued)

(52) U.S. Cl.
CPC . *G02B 15/1441* (2019.08); *G02B 15/144109* (2019.08); *G02B 15/144113* (2019.08);
(Continued)

(58) Field of Classification Search
CPC ................ G02B 15/16; G02B 15/1441; G02B 15/144113; G02B 15/144109; G02B 15/14; G02B 15/144; G02B 15/145; G02B 15/1451; G02B 15/145117; G02B 15/145121; G02B 15/145125; G02B 15/146; G02B 15/1461; G02B 15/173; G02B 27/0025
See application file for complete search history.

(56) References Cited

U.S. PATENT DOCUMENTS

2010/0238566 A1* 9/2010 Inomoto ............... G02B 15/173
359/688
2010/0271710 A1* 10/2010 Ohashi ................. G02B 15/173
359/687
(Continued)

FOREIGN PATENT DOCUMENTS

| JP | 2015-094869 A | 5/2015 |
| JP | 2016-012119 A | 1/2016 |
| JP | 2016-164629 A | 9/2016 |

*Primary Examiner* — Jordan M Schwartz
(74) *Attorney, Agent, or Firm* — Studebaker & Brackett PC

(57) ABSTRACT

The variable magnification optical system includes, in order from an object side, a positive first lens group disposed at a position closest to the object side, a variable magnification lens group which is disposed at a position closest to the object side among negative lens groups and moves during changing magnification, an intermediate group including at least one lens group, and a positive final lens group which is disposed at a position closest to the image side. The variable magnification lens group, the intermediate group, and the final lens group are continuously disposed. The variable magnification optical system includes at least one LA lens. This LA lens satisfies predetermined conditional expressions relating to a refractive index, an Abbe number, and a partial dispersion ratio, and is located from the variable magnification lens group to the intermediate group.

11 Claims, 18 Drawing Sheets

(51) Int. Cl.
*G02B 27/00* (2006.01)
*G02B 15/173* (2006.01)
*G02B 15/17* (2006.01)

(52) U.S. Cl.
CPC ............. *G02B 15/16* (2013.01); *G02B 15/17* (2013.01); *G02B 15/173* (2013.01); *G02B 27/0025* (2013.01)

(56) References Cited

U.S. PATENT DOCUMENTS

| | | |
|---|---|---|
| 2015/0131165 A1 | 5/2015 | Nakamura et al. |
| 2015/0355440 A1* | 12/2015 | Ikeda .................. G02B 15/173 359/684 |
| 2016/0259155 A1 | 9/2016 | Shimada et al. |
| 2016/0274341 A1* | 9/2016 | Yonezawa .............. G02B 15/17 |
| 2018/0095242 A1* | 4/2018 | Iwamoto ................. G02B 9/64 |
| 2019/0265447 A1* | 8/2019 | Hori ....................... G02B 15/16 |

* cited by examiner

EXAMPLE 1

EXAMPLE 3

EXAMPLE 4

EXAMPLE 5

EXAMPLE 6

FIG. 9
EXAMPLE 1
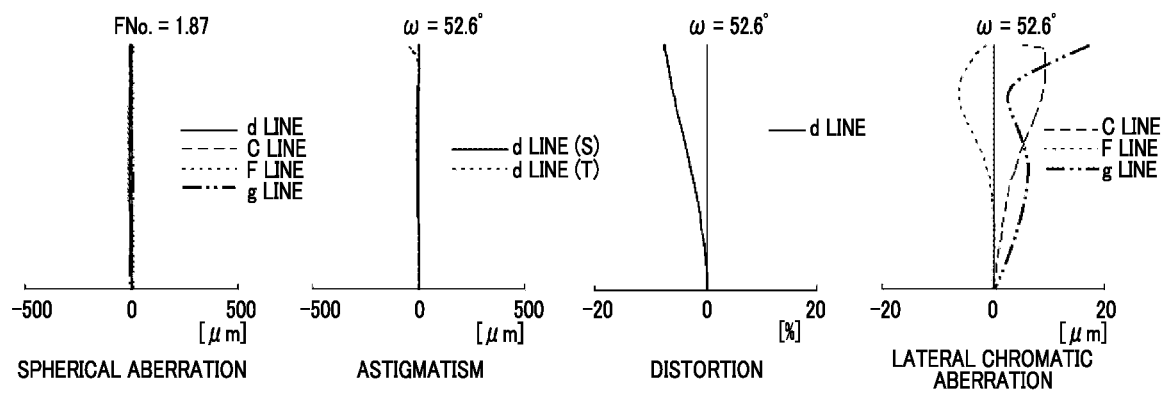
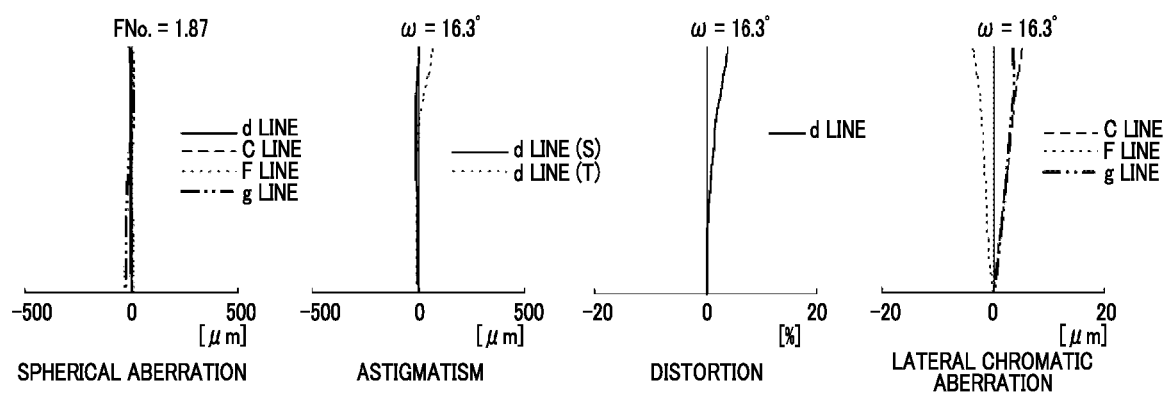
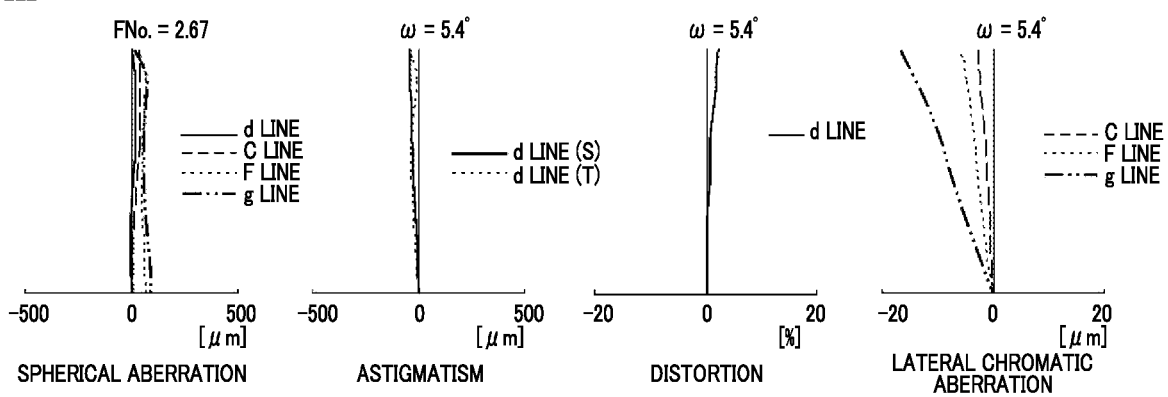

FIG. 10
EXAMPLE 2
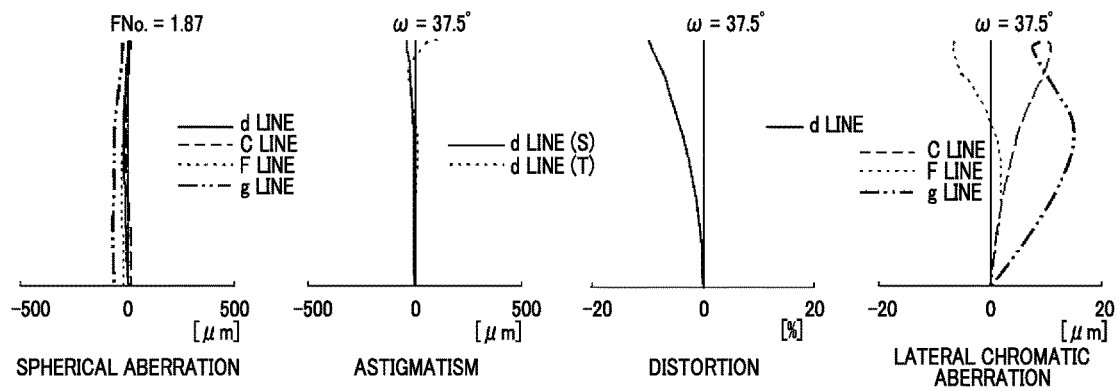
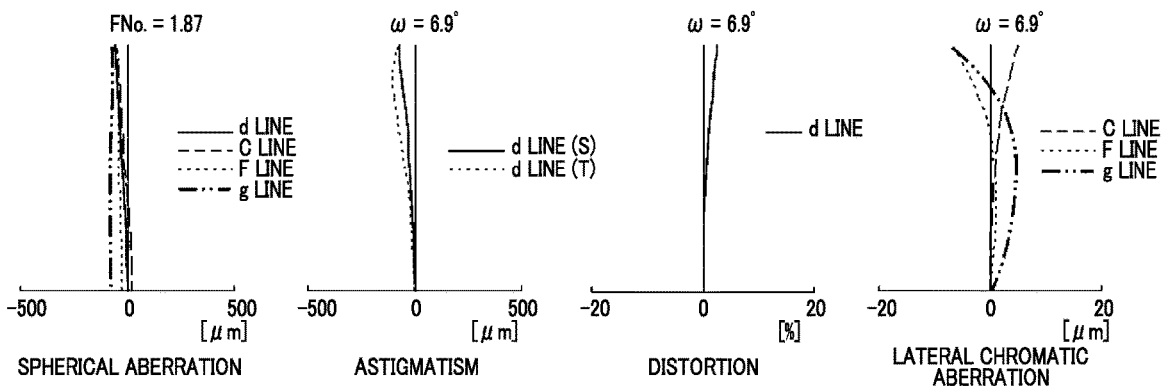
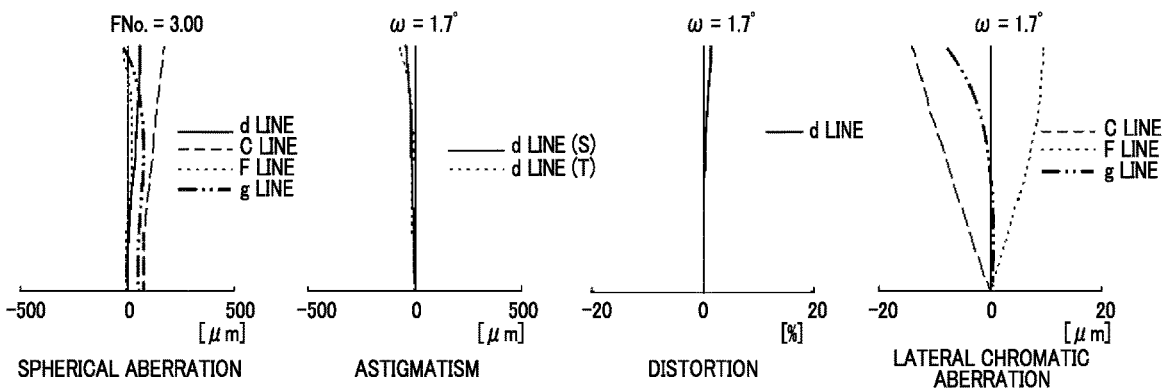

FIG. 11
EXAMPLE 3
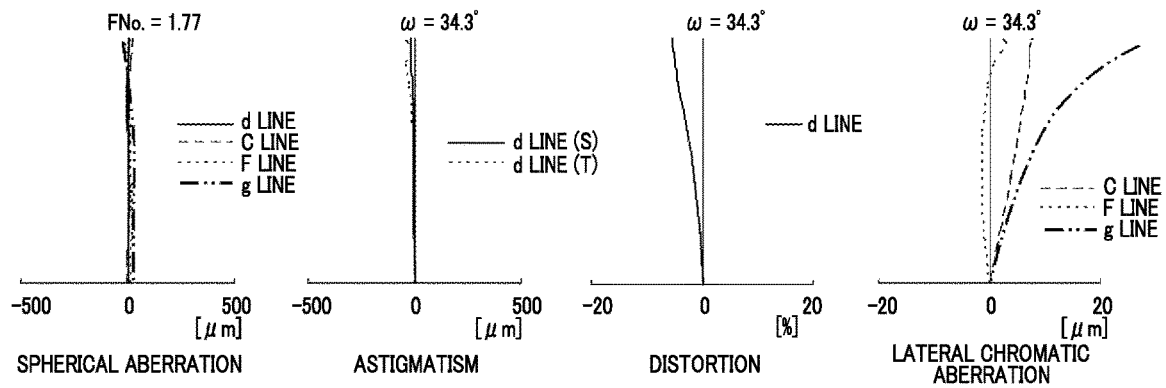
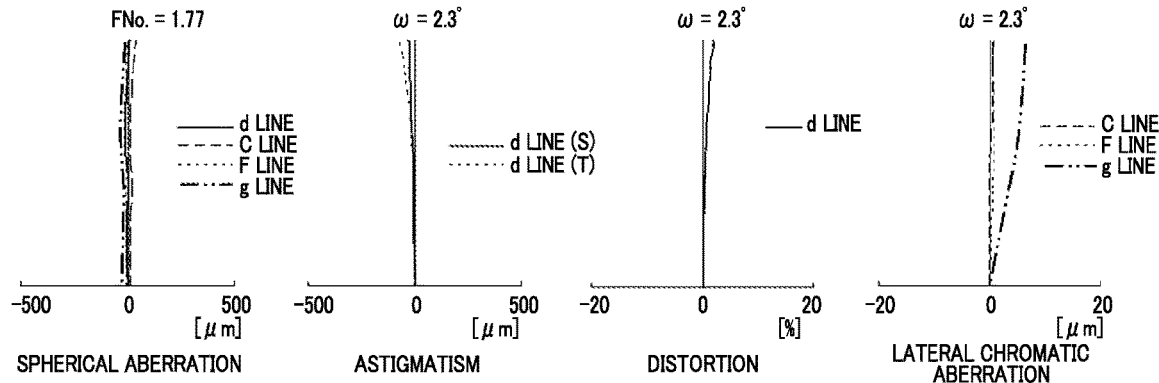
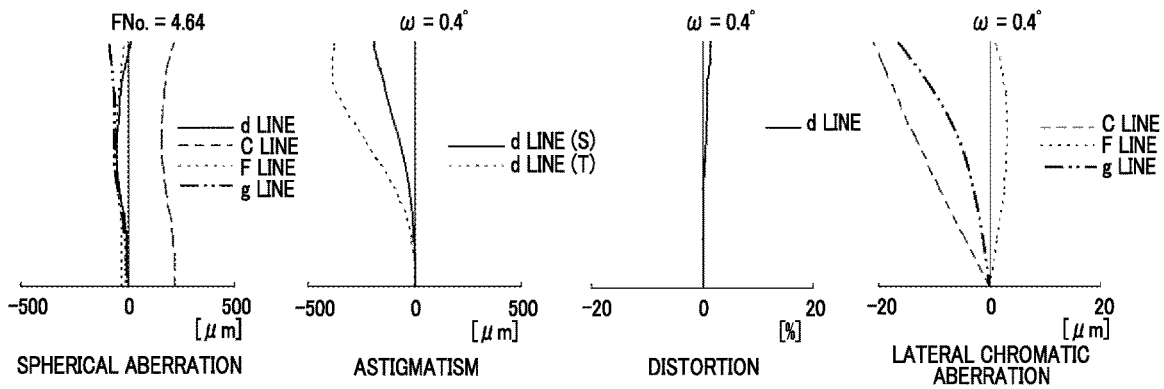

FIG. 12
EXAMPLE 4
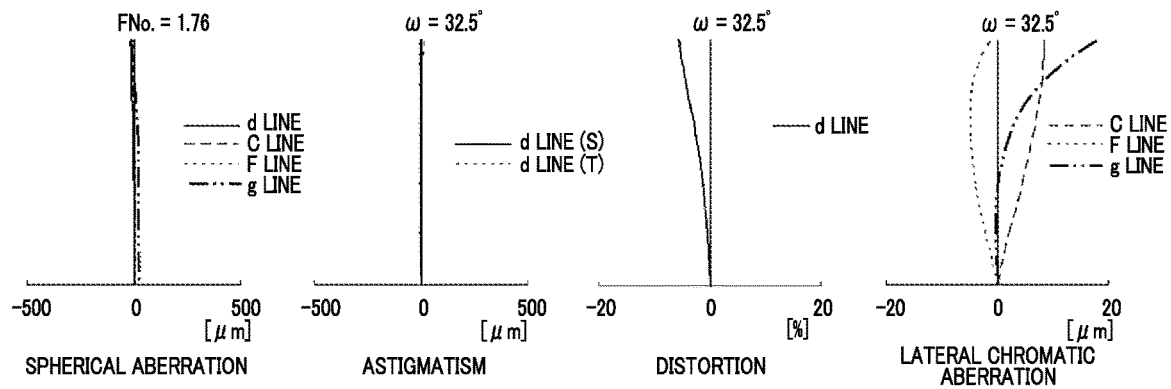
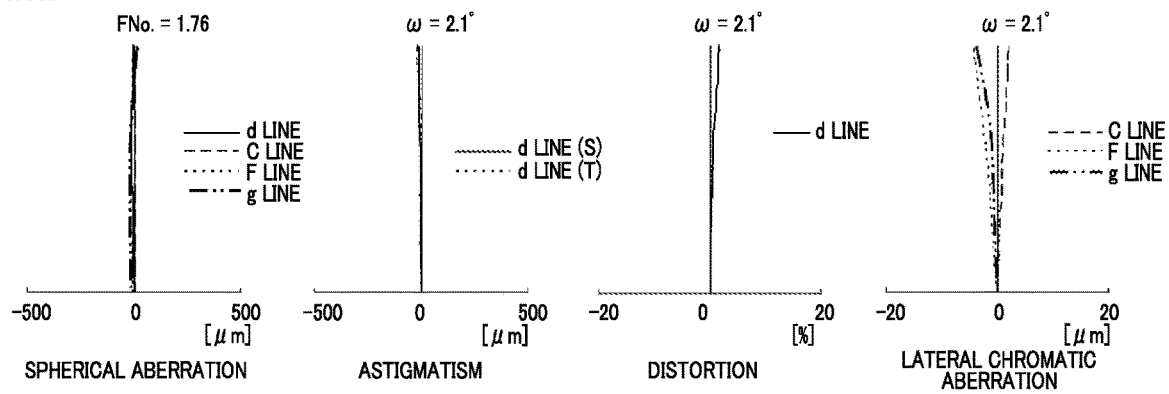
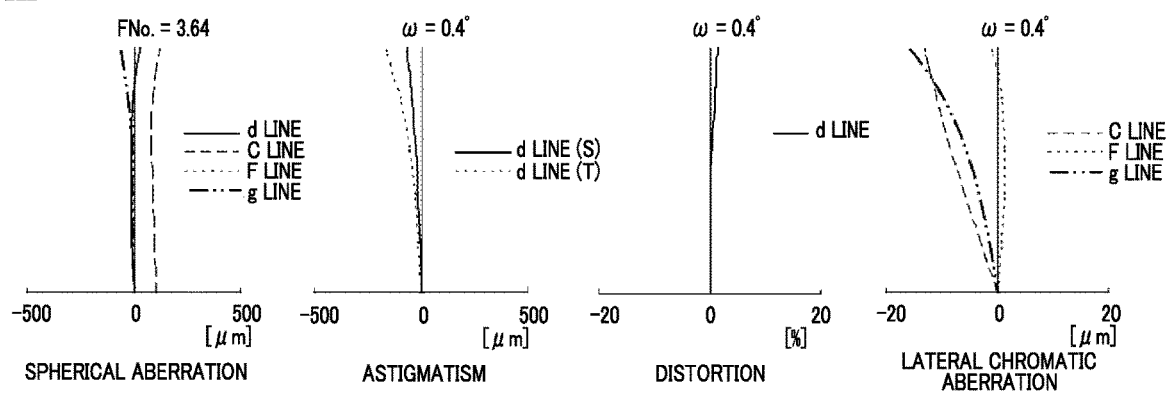

FIG. 13
EXAMPLE 5
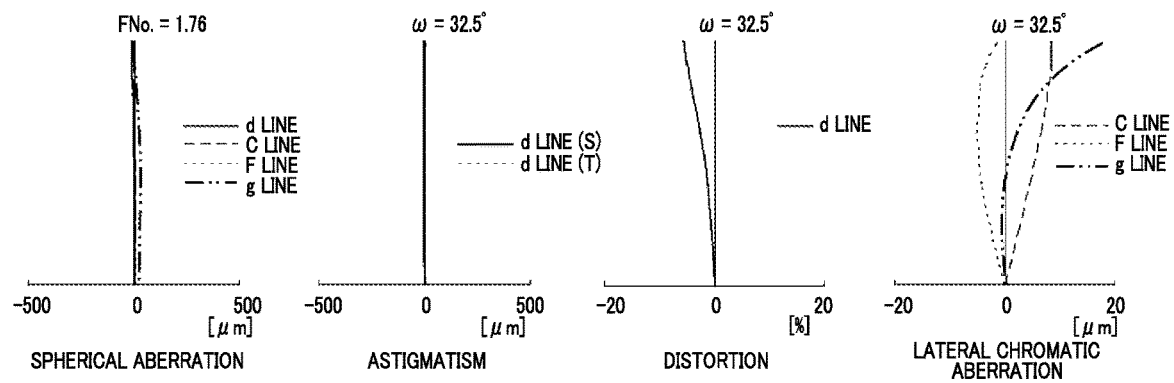
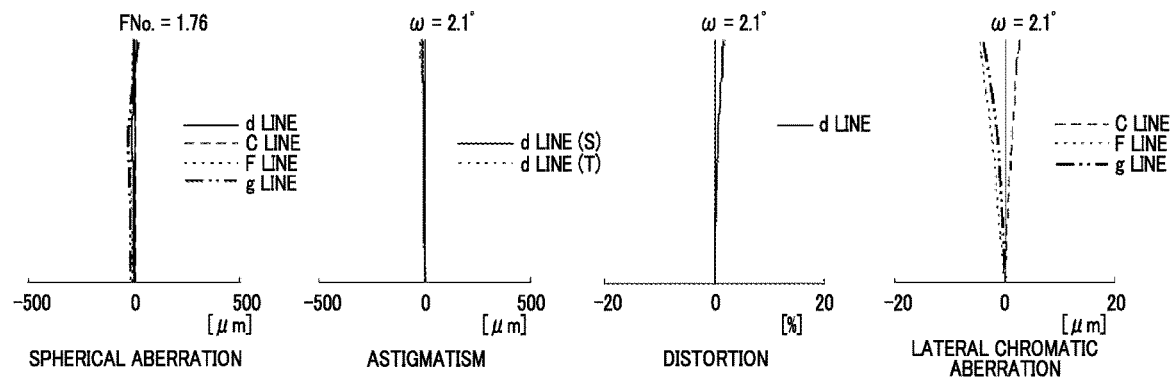
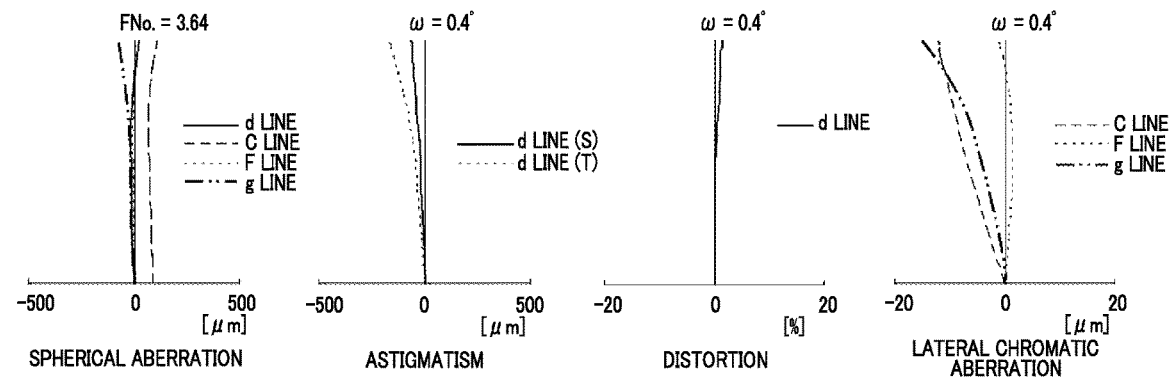

FIG. 14
EXAMPLE 6
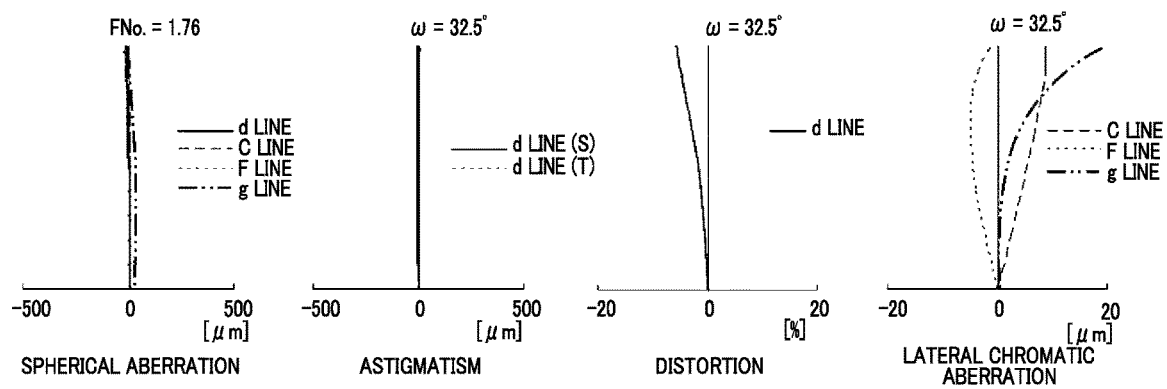
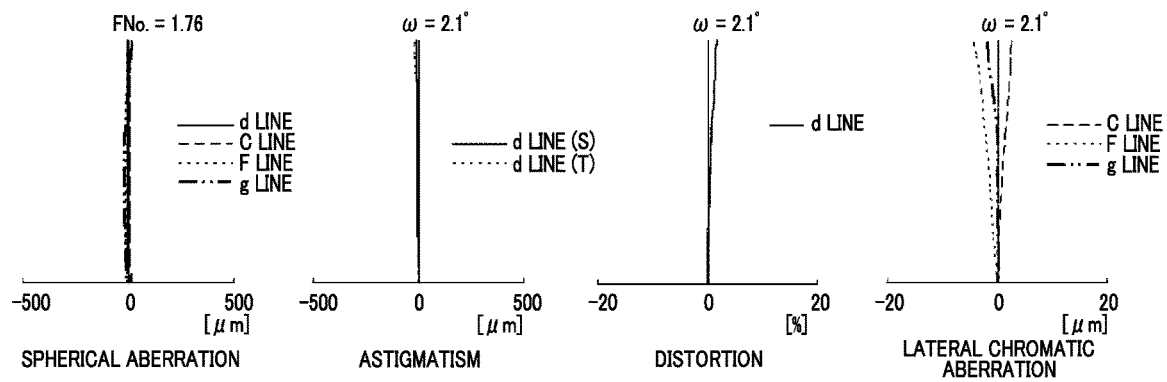
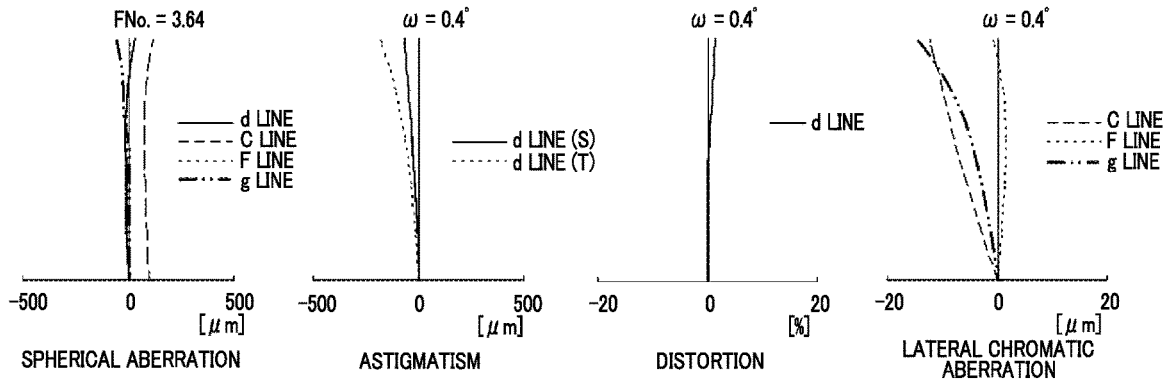

FIG. 15
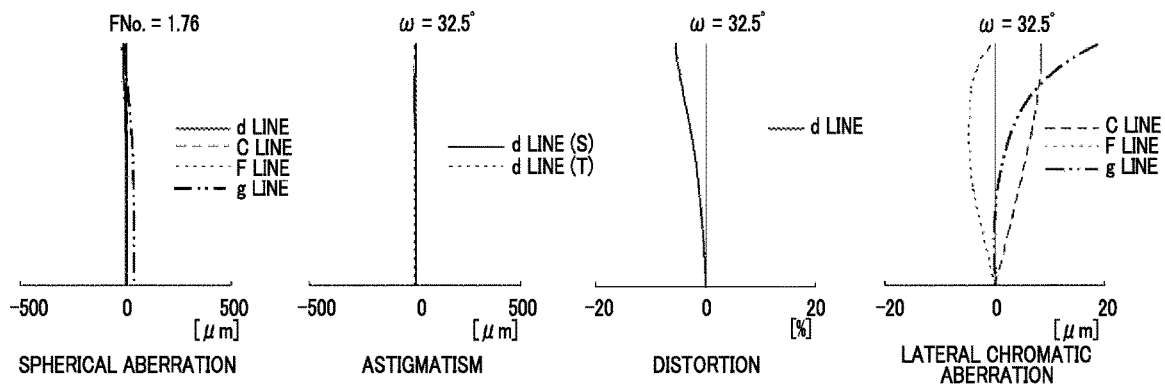
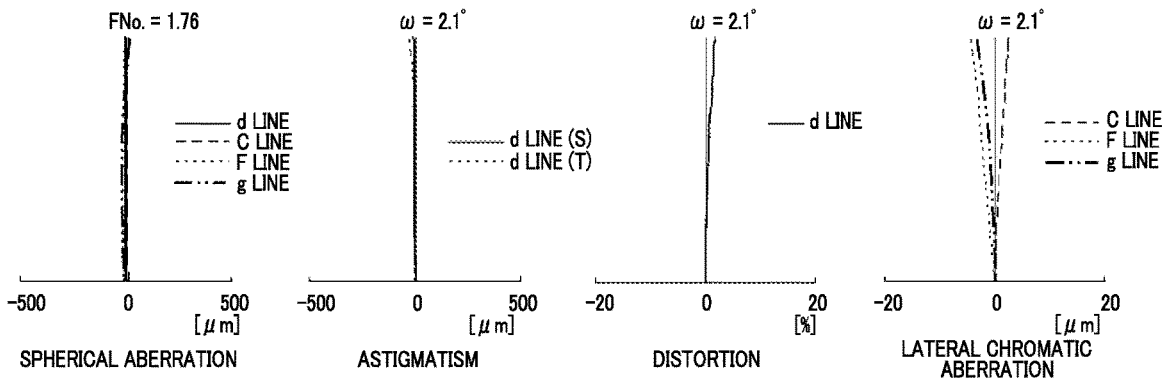
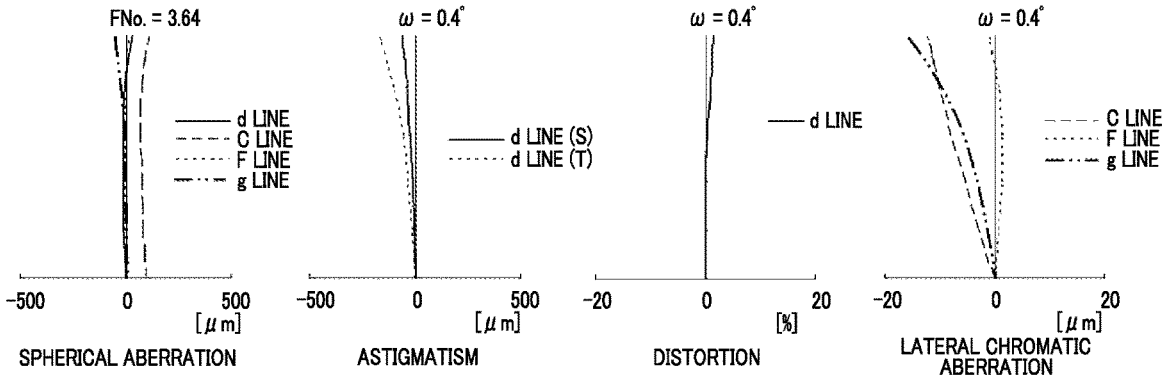

FIG. 16
EXAMPLE 8
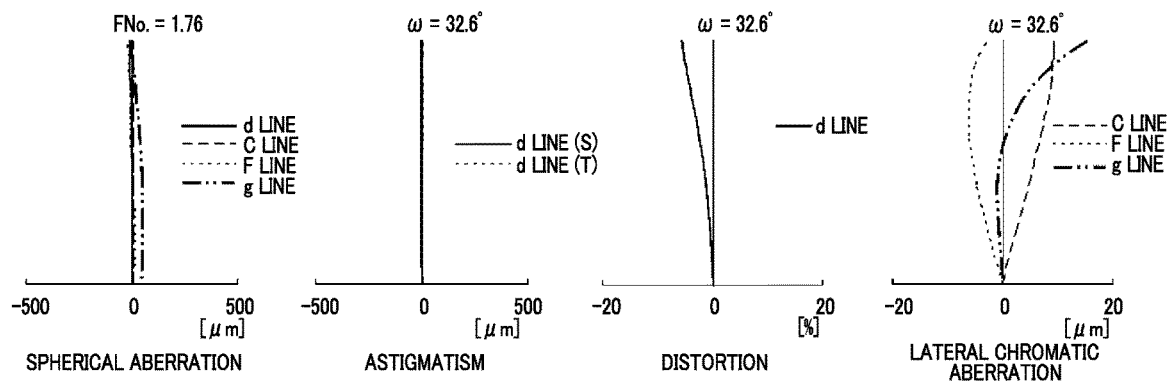
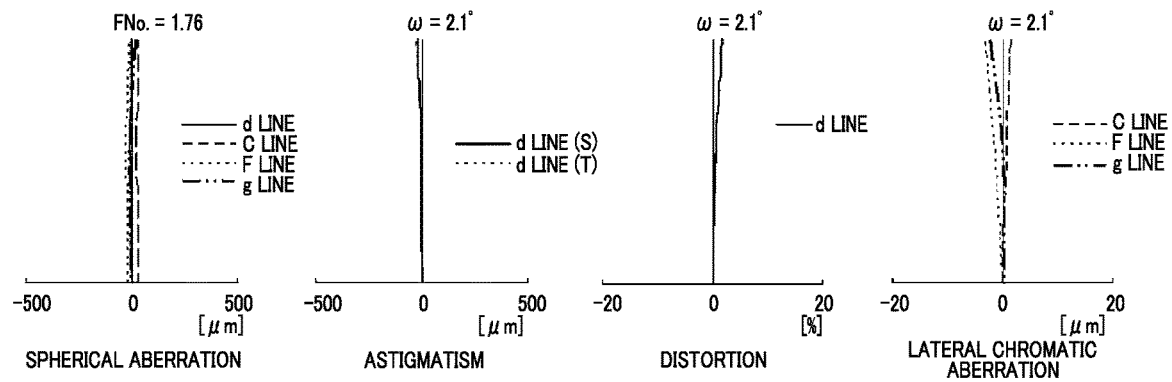
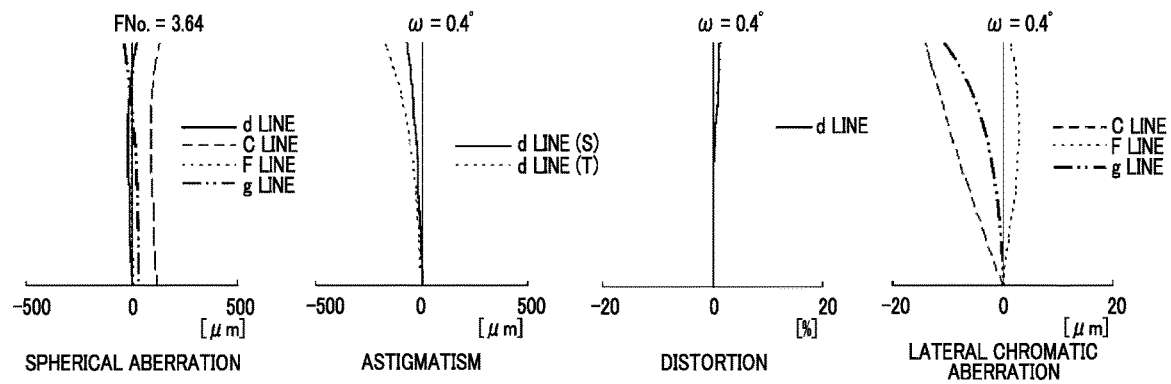

VARIABLE MAGNIFICATION OPTICAL SYSTEM AND OPTICAL APPARATUS

CROSS-REFERENCE TO RELATED APPLICATIONS

The present application claims priority under 35 U.S.C. § 119 to Japanese Patent Application No. 2017-185649, filed on Sep. 27, 2017. The above application is hereby expressly incorporated by reference, in its entirety, into the present application.

BACKGROUND OF THE INVENTION

1. Field of the Invention

The present invention relates to a variable magnification optical system and an optical apparatus, and particularly relates to a variable magnification optical system suitable for a broadcast camera, a motion-picture camera, a digital camera, a video camera, a film camera, a surveillance camera, a projector, or the like, and an optical apparatus including this variable magnification optical system.

2. Description of the Related Art

Hitherto, variable magnification optical systems have been used in an optical apparatus such as a broadcast camera, a motion-picture camera, or a digital camera. For example, JP2015-94869A, JP2016-164629A, and JP2016-12119A disclose a lens system configured as four groups or five groups, as a zoom lens for use in the above optical apparatus.

SUMMARY OF THE INVENTION

In recent years, there has been progress in an increase in the performance of an imaging element used in combination with a lens system in the optical apparatus, and variable magnification optical systems have thus been required in which various aberrations inclusive of chromatic aberration are corrected to a higher degree. In order to cope with this trend, it is necessary to further optimize lens configurations, such as to appropriately select materials of lenses or to appropriately dispose each of the lenses. In view of such circumstances, there is a need for a lens system in which aberration correction is further improved from the lens systems disclosed in JP2015-94869A, JP2016-164629A, and JP2016-12119A.

An object of the present invention is to provide a variable magnification optical system having high optical performance by various aberrations inclusive of chromatic aberration being satisfactorily corrected, and an optical apparatus including this variable magnification optical system.

According to the present invention, there is provided a first variable magnification optical system comprising, in order from an object side toward an image side: a first lens group having a positive refractive power which is disposed at a position closest to the object side; a variable magnification lens group which is disposed at a position closest to the object side among lens groups having a negative refractive power and moves during changing magnification; an intermediate group including at least one lens group; and a final lens group having a positive refractive power which is disposed at a position closest to the image side, wherein the variable magnification lens group, the intermediate group, the final lens group are continuously disposed, a distance between lens groups adjacent to each other during changing magnification in a direction of an optical axis changes, and at least one LA lens is included which satisfies the following Conditional Expressions (1A), (2A), and (3A), and is located from the variable magnification lens group to the intermediate group, in a case where a refractive index at a d line of the LA lens is set to NdA, an Abbe number of the LA lens on the basis of the d line is set to vdA, and a partial dispersion ratio of the LA lens between a g line and an F line is set to θgFA.

$$1.92 < NdA < 2.3 \quad (1A)$$

$$26 < vdA < 28.5 \quad (2A)$$

$$0.62 < \theta gFA + 0.00162 \times vdA < 0.9 \quad (3A)$$

In the first variable magnification optical system of the present invention, it is preferable to further comprise at least one lens group that satisfies the following Conditional Expression (4A), in a case where a focal length of a lens group including the LA lens is set to fGA, and a focal length of the LA lens is set to fA.

$$-1 < fGA/fA < 1 \quad (4A)$$

In the first variable magnification optical system of the present invention, it is preferable to further comprise at least one lens group that satisfies the following Conditional Expression (5A), in a case where the total number of lenses composing a lens group including the LA lens is set to ka, a natural number from 1 to ka is set to i, a partial dispersion ratio between the g line and the F line of an i-th lens from the object side of the lens group including the LA lens is set to θgFai, a focal length of the i-th lens from the object side of the lens group including the LA lens is set to fai, and a focal length of the lens group including the LA lens is set to fGA.

$$-0.5 < \sum_{i=1}^{ka} \frac{\theta gFai}{fai} \times fGA < 0.6 \quad (5A)$$

In the first variable magnification optical system of the present invention, it is preferable that the variable magnification lens group includes at least one negative lens and at least one positive lens, and satisfies the following Conditional Expression (6) in a case where an average value of partial dispersion ratios between the g line and the F line of all the negative lenses within the variable magnification lens group disposed closer to the object side than a positive lens of the variable magnification lens group closest to the object side is set to θvnf.

$$0.58 < \theta vnf < 0.8 \quad (6)$$

The first variable magnification optical system of the present invention may be configured such that the variable magnification lens group includes at least one negative lens and at least one positive lens, and that at least one of negative lenses within the variable magnification lens group disposed closer to the object side than a positive lens of the variable magnification lens group closest to the object side is the LA lens.

The first variable magnification optical system of the present invention may be configured such that a lens group closest to the image side within the intermediate group includes at least one negative lens, and that at least one of negative lenses within the lens group closest to the image side within the intermediate group is the LA lens.

In the first variable magnification optical system of the present invention, it is preferable that the first lens group remains stationary with respect to an image surface during changing magnification.

In addition, according to the present invention, there is provided a second variable magnification optical system comprising, in order from an object side toward an image side: a first lens group having a positive refractive power which is disposed at a position closest to the object side; a variable magnification lens group which is disposed at a position closest to the object side among lens groups having a negative refractive power and moves during changing magnification; an intermediate group including at least one lens group; and a final lens group having a positive refractive power which is disposed at a position closest to the image side, wherein the variable magnification lens group, the intermediate group, the final lens group are continuously disposed, a distance between lens groups adjacent to each other during changing magnification in a direction of an optical axis changes, and at least one LB lens is included which satisfies the following Conditional Expressions (1B), (2B), and (3B), and is located from the variable magnification lens group to the final lens group in a case where a refractive index at a d line of the LB lens is set to NdB, an Abbe number of the LB lens on the basis of the d line is set to vdB, and a partial dispersion ratio of the LB lens between a g line and an F line is set to θgFB.

$$1.92 < NdB < 2.3 \quad (1B)$$

$$26 < vdB < 28 \quad (2B)$$

$$0.62 < \theta gFB + 0.00162 \times vdB < 0.9 \quad (3B)$$

In the second variable magnification optical system of the present invention, it is preferable to further comprise at least one lens group that satisfies the following Conditional Expression (4B) in a case where a focal length of a lens group including the LB lens is set to fGB, and a focal length of the LB lens is set to fB.

$$-1 < fGB/fB < 1 \quad (4B)$$

In the second variable magnification optical system of the present invention, it is preferable to further comprise at least one lens group that satisfies the following Conditional Expression (5B) in a case where the total number of lenses composing a lens group including the LB lens is set to kb, a natural number from 1 to kb is set to j, a partial dispersion ratio between the g line and the F line of a j-th lens from the object side of the lens group including the LB lens is set to θgFbj, a focal length of the j-th lens from the object side of the lens group including the LB lens is set to fbj, and a focal length of the lens group including the LB lens is set to fGB.

$$-0.5 < \sum_{j=1}^{kb} \frac{\theta g F b j}{f b j} \times f G B < 0.6 \quad (5B)$$

In the second variable magnification optical system of the present invention, it is preferable that the variable magnification lens group includes at least one negative lens and at least one positive lens, and satisfies the following Conditional Expression (6) in a case where an average value of partial dispersion ratios between the g line and the F line of all the negative lenses within the variable magnification lens group disposed closer to the object side than a positive lens of the variable magnification lens group closest to the object side is set to θvnf.

$$0.58 < \theta vnf < 0.8 \quad (6)$$

The second variable magnification optical system of the present invention may be configured such that the variable magnification lens group includes at least one negative lens and at least one positive lens, and that at least one of negative lenses within the variable magnification lens group disposed closer to the object side than a positive lens of the variable magnification lens group closest to the object side is the LB lens.

The second variable magnification optical system of the present invention may be configured such that the final lens group includes at least one positive lens, and that a positive lens of the final lens group closest to the object side is the LB lens.

The second variable magnification optical system of the present invention may be configured such that the final lens group includes at least one negative lens, and that a negative lens of the final lens group closest to the image side is the LB lens.

The second variable magnification optical system of the present invention may be configured such that a lens group closest to the image side within the intermediate group includes at least one negative lens, and that at least one of negative lenses within the lens group closest to the image side within the intermediate group is the LB lens.

In the second variable magnification optical system of the present invention, it is preferable that the first lens group remains stationary with respect to an image surface.

According to the present invention, there is provided an optical apparatus comprising the variable magnification optical system of the present invention.

Meanwhile, in the present specification, the wordings "consists of ~" and "consist(ing) of ~" are intended to be allowed to include a lens having substantially no refractive power, optical elements, other than a lens, such as a stop, a filter, and cover glass, or mechanism portions such as a lens flange, a lens barrel, an imaging element, a camera-shake correction mechanism, and the like, in addition to the things enumerated as elements.

Meanwhile, in the present specification, the wording "~ group having a positive refractive power" means that the group has a positive refractive power as a whole. Similarly, the wording "~ group having a negative refractive power" means that the group has a negative refractive power as a whole. The sign of refractive power assumed to be that in a paraxial region in a case where an aspherical surface is included. Regarding the term "lens group", in a case where the lens group is divided at a distance changing during changing magnification, a lens group included in one division is handled as one lens group. The term "lens group" is not necessarily composed of a plurality of lenses, but may be composed of only one lens. The above conditional expressions are all based on a d line (a wavelength of 587.6 nm (nanometer)) in a state of being focused on an infinite object.

Meanwhile, a partial dispersion ratio θgF of a certain lens between a g line and an F line is defined by θgF=(Ng−NF)/(NF−NC) in a case where the refractive indices of the lens at a g line (a wavelength of 435.8 nm (nanometer)), an F line (a wavelength of 486.1 nm (nanometer)), and a C line (a wavelength of 656.3 nm (nanometer)) are set to Ng, NF, and NC, respectively.

According to the invention, in a lens system including, in order from an object side, a positive first lens group which is disposed at a position closest to the object side, a variable magnification lens group which is disposed at a position closest to the object side among negative lens groups and moves during changing magnification, an intermediate group including at least one lens group, and a positive final lens group which is disposed at a position closest to an image side, wherein the variable magnification lens group, the intermediate group, and the final lens group are continuously disposed, lenses formed of a material for satisfying predetermined conditional expressions are disposed in a predetermined range, whereby it is possible to provide a variable magnification optical system having high optical performance by various aberrations inclusive of chromatic aberration being satisfactorily corrected, and an optical apparatus including this variable magnification optical system.

BRIEF DESCRIPTION OF THE DRAWINGS

FIG. 9 is a diagram of aberrations of the variable magnification optical system of Example 1 of the present invention.

FIG. 10 is a diagram of aberrations of the variable magnification optical system of Example 2 of the present invention.

FIG. 11 is a diagram of aberrations of the variable magnification optical system of Example 3 of the present invention.

FIG. 12 is a diagram of aberrations of the variable magnification optical system of Example 4 of the present invention.

FIG. 13 is a diagram of aberrations of the variable magnification optical system of Example 5 of the present invention.

FIG. 14 is a diagram of aberrations of the variable magnification optical system of Example 6 of the present invention.

FIG. 15 is a diagram of aberrations of the variable magnification optical system of Example 7 of the present invention.

FIG. 16 is a diagram of aberrations of the variable magnification optical system of Example 8 of the present invention.

DESCRIPTION OF THE PREFERRED EMBODIMENTS

Figure 1:
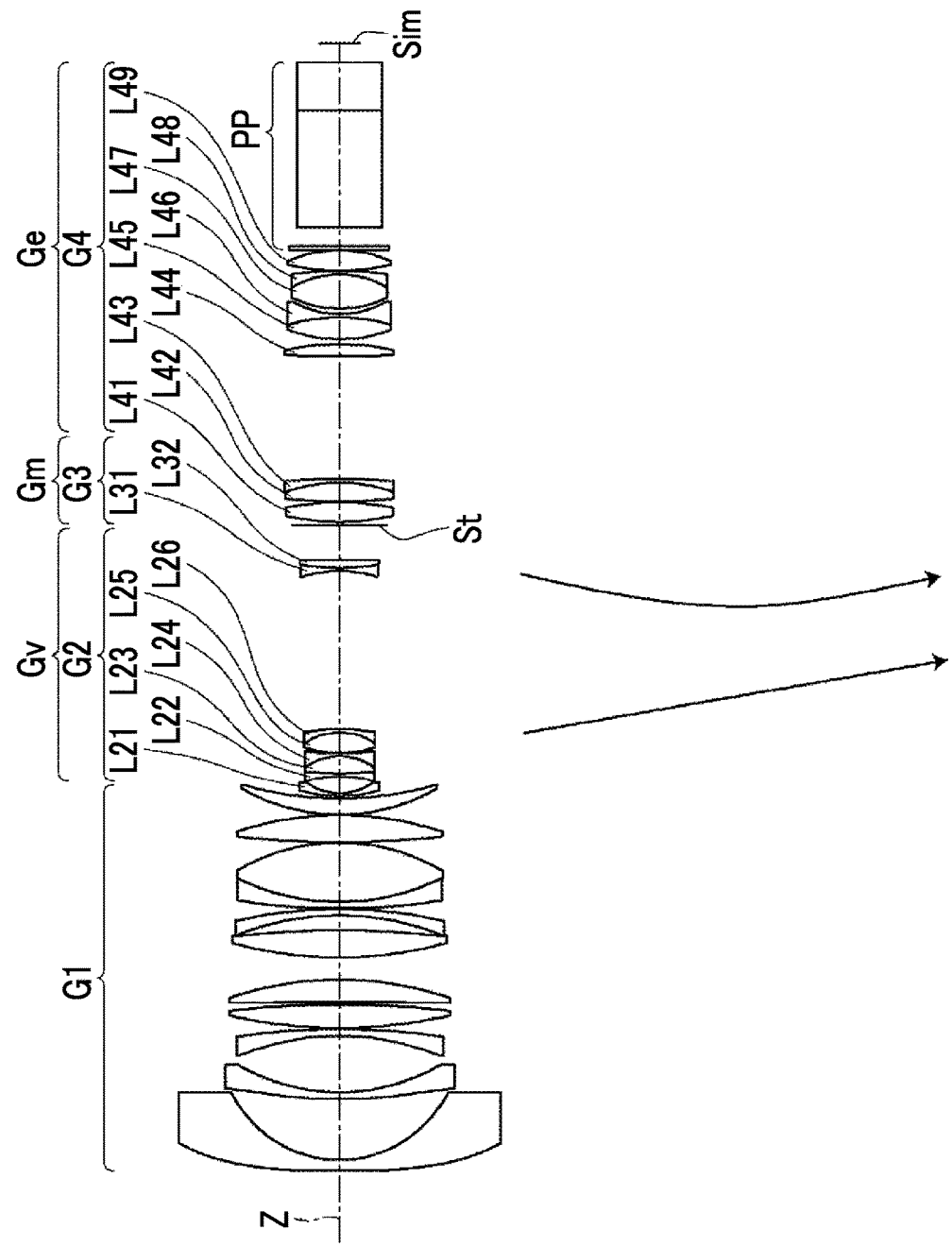
FIG. 1 is a cross-sectional view illustrating a configuration of a variable magnification optical system of Example 1 of the present invention.

Hereinafter, an embodiment of the present invention will be described in detail with reference to the accompanying drawings. First, a variable magnification optical system according to a first embodiment of the present invention will be described with reference to FIG. 1. FIG. 1 is a cross-sectional view illustrating a configuration of a variable magnification optical system according to the first embodiment of the present invention. The example shown in FIG. 1 corresponds to a variable magnification optical system of Example 1 described later. In FIG. 1, a state of being focused on an infinite object at a wide-angle end is shown, the left side is an object side, and the right side is an image side.

The variable magnification optical system of the present embodiment includes a first lens group G1 having a positive refractive power disposed at a position closest to the object side, a variable magnification lens group Gv having a negative refractive power which is disposed at a position closest to the object side among lens groups having a negative refractive power and moves during changing magnification, an intermediate group Gm including at least one lens group, and a final lens group Ge having a positive refractive power which is disposed at a position closest to the image side, in order from the object side toward the image side along an optical axis Z. The variable magnification lens group Gv, the intermediate group Gm, and the final lens group Ge are continuously disposed, and have a change in a distance between lens groups adjacent to each other during changing magnification in the direction of the optical axis. With the above configuration, it is possible to have a great changing magnification action while maintaining the entire length to be short. Meanwhile, it is preferable that the variable magnification lens group Gv moves to the image side along the optical axis Z during changing magnification from a wide-angle end to a telephoto end. Such a configuration leads to an advantage by having a great changing magnification action while maintaining the entire length to be short.

The variable magnification optical system of the example shown in FIG. 1 consists of a first lens group G1 having a positive refractive power, a second lens group G2 having a negative refractive power, a third lens group G3 having a refractive power, and a fourth lens group G4 having a refractive power, in order from the object side toward the image side along the optical axis Z. During changing magnification, the second lens group G2 and the third lens group G3 move in trajectories different from each other, and the first lens group G1 and the fourth lens group G4 remain stationary with respect to an image surface Sim. In FIG. 1, the schematic movement trajectory of each lens group moving during changing magnification from the wide-angle end to the telephoto end is shown by an arrow below the second lens group G2 and the third lens group G3. In the example shown in FIG. 1, the second lens group G2 corresponds to the variable magnification lens group Gv, the third lens group G3 corresponds to the intermediate group Gm, and the fourth lens group G4 corresponds to the final lens group Ge. In the example shown in FIG. 1, the intermediate group Gm consists of one lens group.

In the example shown in FIG. 1, the first lens group G1 consists of eleven lenses, the second lens group G2 consists of six lenses, that is, lenses L21 to L26 in order from the object side toward the image side, the third lens group G3 consists of two lenses, that is, lenses L31 and L32 in order from the object side toward the image side, and the fourth lens group G4 consists of an aperture stop St and nine lenses, that is, lenses L41 to L49 in order from the object side toward the image side.

Meanwhile, FIG. 1 shows an example in which an optical member PP of which the incidence surface and the emission surface are parallel to each other is disposed between a lens closest to the image side and the image surface Sim. The optical member PP is assumed to be protective cover glass, various types of filters, a prism, and the like. The optical member PP in FIG. 1 consists of three members, but the number of members composing the optical member PP is not limited to that shown in FIG. 1, and a configuration can also be used in which the optical member PP is omitted.

In a case where a refractive index at a d line of a lens included in the whole system is set to Nd, an Abbe number of the lens on the basis of the d line is set to vd, and a partial dispersion ratio of the lens between a g line and an F line is set to θgF, the variable magnification optical system of the first embodiment is configured to include at least one LA lens that satisfies the following Conditional Expressions (1), (2a), and (3), and is located from the variable magnification lens group Gv to the intermediate group Gm.

$$1.92 < Nd < 2.3 \tag{1}$$

$$26 < vd < 28.5 \tag{2a}$$

$$0.62 < \theta gF + 0.00162 \times vd < 0.9 \tag{3}$$

The value (Nd) is not set to be equal to or less than the lower limit of Conditional Expression (1), and thus it is possible to prevent the absolute value of curvature from becoming excessively large, and to suppress the generation of a difference between spherical aberrations due to wavelength by suppressing the generation of higher-order spherical aberration. The value (Nd) is not set to be equal to or less than the upper limit of Conditional Expression (1), and thus it is possible to prevent dispersion from increasing, and to suppress the generation of chromatic aberration. Meanwhile, in a case where the following Conditional Expression (1-1) is satisfied instead of Conditional Expression (1), it is possible to make characteristics more satisfactory.

$$1.95 < Nd < 2.2 \tag{1-1}$$

A material for satisfying Conditional Expression (2a) and Conditional Expression (3) is used, and thus it is possible to satisfactorily suppress on-axis chromatic aberration, lateral chromatic aberration, and second-order chromatic aberration. Meanwhile, in a case where the following Conditional Expression (2a-1) is satisfied instead of Conditional Expression (2a), it is possible to make characteristics more satisfactory. Similarly, in a case where the following Conditional Expression (3-1) is satisfied instead of Conditional Expression (3), it is possible to make characteristics more satisfactory.

$$26.5 < vd < 28.3 \tag{2a-1}$$

$$0.63 < \theta gF + 0.00162 \times vd < 0.7 \tag{3-1}$$

In a case where the focal length of a lens group including the LA lens is set to fGA, and the focal length of the LA lens is set to fA, it is preferable that the variable magnification optical system of the present embodiment includes at least one lens group that satisfies the following Conditional Expression (4A).

$$-1 < fGA/fA < 1 \tag{4A}$$

In such a case, it is possible to prevent the effect of Conditional Expression (2a) and Conditional Expression (3) from being in excess. Meanwhile, in a case where the following Conditional Expression (4A-1) is satisfied instead of Conditional Expression (4A), it is possible to make characteristics more satisfactory. In a case where the following Conditional Expression (4A-2) is satisfied instead thereof, it is possible to make characteristics still more satisfactory.

$$-0.9 < fGA/fA < 0.95 \tag{4A-1}$$

$$-0.8 < fGA/fA < 0.8 \tag{4A-2}$$

In addition, in a case where the total number of lenses composing a lens group including the LA lens is set to ka, a natural number from 1 to ka is set to i, the partial dispersion ratio between the g line and the F line of an i-th lens from the object side of the lens group including the LA lens is set to θgFai, the focal length of the i-th lens from the object side of the lens group including the LA lens is set to fai, and the focal length of the lens group including the LA lens is set to fGA, it is preferable that the variable magnification optical system of the present embodiment includes at least one lens group that satisfies the following Conditional Expression (5A).

$$-0.5 < \sum_{i=1}^{ka} \frac{\theta gFai}{fai} \times fGA < 0.6 \tag{5A}$$

In such a case, it is possible to suppress the generation of second-order chromatic aberration within the lens group. Meanwhile, in a case where the following Conditional Expression (5A-1) is satisfied instead of Conditional Expression (5A), it is possible to make characteristics more satisfactory.

$$-0.35 < \sum_{i=1}^{ka} \frac{\theta gFai}{fai} \times fGA < 0.56 \tag{5A-1}$$

The LA lens may be configured to be included in the variable magnification lens group Gv. For example, the variable magnification lens group Gv may be configured to include at least one negative lens and at least one positive lens, and may be configured such that at least one of negative lenses within the variable magnification lens group Gv disposed closer to the object side than a positive lens of the variable magnification lens group Gv closest to the object side is the LA lens. In such a case, it is possible to satisfactorily correct the suppression of a fluctuation in second-order lateral chromatic aberration due to changing magnification and the suppression of second-order on-axis chromatic aberration at the telephoto end while keeping a balance therebetween.

The LA lens may be configured to be included in a lens group closest to the image side within the intermediate group Gm. For example, the lens group closest to the image side within the intermediate group Gm may be configured to include at least one negative lens, and may be configured such that at least one of negative lenses within the lens group closest to the image side within the intermediate group Gm is the LA lens. In such a case, it is possible to suppress a fluctuation in second-order on-axis chromatic aberration due to changing magnification.

Next, a variable magnification optical system according to a second embodiment of the present invention will be described. The example shown in FIG. 1 also includes a configuration of the second embodiment of the present invention. The variable magnification optical system of the second embodiment includes a first lens group G1 having a positive refractive power disposed at a position closest to the object side, a variable magnification lens group Gv having a negative refractive power which is disposed at a position closest to the object side among lens groups having a negative refractive power and moves during changing magnification, an intermediate group Gm including at least one lens group, and a final lens group Ge having a positive refractive power which is disposed at a position closest to the image side, in order from the object side toward the image side along an optical axis Z. The variable magnification lens group Gv, the intermediate group Gm, and the final lens group Ge are continuously disposed, and have a change in a distance between lens groups adjacent to each other during changing magnification in the direction of the optical axis. The above group configuration is the same as that of the variable magnification optical system of the first embodiment, and the same is true of the effect thereof. In addition, in the second embodiment, it is also preferable that the variable magnification lens group Gv moves to the image side along the optical axis Z during changing magnification from the wide-angle end to the telephoto end. The effect in this case is also the same as the effect described in the first embodiment.

In a case where a refractive index at a d line of a lens included in the whole system is set to Nd, an Abbe number of the lens on the basis of the d line is set to vd, and a partial dispersion ratio of the lens between a g line and an F line is set to θgF, the variable magnification optical system of the second embodiment is configured to include at least one LB lens that satisfies the following Conditional Expressions (1), (2b), and (3), and is located from the variable magnification lens group Gv to the final lens group Ge.

$$1.92 < Nd < 2.3 \quad (1)$$

$$26 < vd < 28 \quad (2b)$$

$$0.62 < \theta gF + 0.00162 \times vd < 0.9 \quad (3)$$

The value (Nd) is not set to be equal to or less than the lower limit of Conditional Expression (1), and thus it is possible to prevent the absolute value of curvature from becoming excessively large, and to suppress the generation of a difference between spherical aberrations due to wavelength by suppressing the generation of higher-order spherical aberration. The value (Nd) is not set to be equal to or less than the upper limit of Conditional Expression (1), and thus it is possible to prevent dispersion from increasing, and to suppress the generation of chromatic aberration. Meanwhile, in a case where the following Conditional Expression (1-1) is satisfied instead of Conditional Expression (1), it is possible to make characteristics more satisfactory.

$$1.95 < Nd < 2.2 \quad (1-1)$$

A material for satisfying Conditional Expression (2b) and Conditional Expression (3) is used, and thus it is possible to satisfactorily suppress on-axis chromatic aberration, lateral chromatic aberration, and second-order chromatic aberration. Meanwhile, in a case where the following Conditional Expression (2b-1) is satisfied instead of Conditional Expression (2b), it is possible to make characteristics more satisfactory. Similarly, in a case where the following Conditional Expression (3-1) is satisfied instead of Conditional Expression (3), it is possible to make characteristics more satisfactory.

$$26.5 < vd < 27.5 \quad (2b-1)$$

$$0.63 < \theta gF + 0.00162 \times vd < 0.7 \quad (3-1)$$

In a case where the focal length of a lens group including the LB lens is set to fGB, and the focal length of the LB lens is set to fB, it is preferable that the variable magnification optical system of the present embodiment includes at least one lens group that satisfies the following Conditional Expression (4B).

$$-1 < fGB/fB < 1 \quad (4B)$$

In such a case, it is possible to prevent the effect of Conditional Expression (2b) and Conditional Expression (3) from being in excess. Meanwhile, in a case where the following Conditional Expression (4B-1) is satisfied instead of Conditional Expression (4B), it is possible to make characteristics more satisfactory. In a case where the following Conditional Expression (4B-2) is satisfied instead thereof, it is possible to make characteristics still more satisfactory.

$$-0.9 < fGB/fB < 0.95 \quad (4B-1)$$

$$-0.8 < fGB/fB < 0.8 \quad (4B-2)$$

In addition, in a case where the total number of lenses composing a lens group including the LB lens is set to kb, a natural number from 1 to kb is set to j, a partial dispersion ratio between the g line and the F line of a j-th lens from the object side of the lens group including the LB lens is set to θgFbj, a focal length of the j-th lens from the object side of the lens group including the LB lens is set to fbj, and a focal length of the lens group including the LB lens is set to fGB, it is preferable that the variable magnification optical system of the present embodiment includes at least one lens group that satisfies the following Conditional Expression (5B).

$$-0.5 < \sum_{j=1}^{kb} \frac{\theta gFbj}{fbj} \times fGB < 0.6 \quad (5B)$$

In such a case, it is possible to suppress the generation of second-order chromatic aberration within the lens group. Meanwhile, in a case where the following Conditional Expression (5B-1) is satisfied instead of Conditional Expression (5B), it is possible to make characteristics more satisfactory.

$$-0.35 < \sum_{j=1}^{kb} \frac{\theta gFbj}{fbj} \times fGB < 0.56 \quad (5B-1)$$

The LB lens may be configured to be included in the variable magnification lens group Gv. For example, the variable magnification lens group Gv may be configured to include at least one negative lens and at least one positive lens, and may be configured such that at least one of negative lenses within the variable magnification lens group Gv disposed closer to the object side than a positive lens of the variable magnification lens group Gv closest to the object side is the LB lens. In such a case, it is possible to satisfactorily correct the suppression of a fluctuation in second-order lateral chromatic aberration due to changing magnification and the suppression of second-order on-axis chromatic aberration at the telephoto end while keeping a balance therebetween.

The LB lens may be configured to be included in the lens group closest to the image side within the intermediate group Gm. For example, the lens group closest to the image side within the intermediate group Gm may be configured to include at least one negative lens, and may be configured such that at least one of negative lenses within the lens group closest to the image side within the intermediate group Gm is the LB lens. In such a case, it is possible to suppress a fluctuation in second-order on-axis chromatic aberration due to changing magnification.

The LB lens may be configured to be included in the final lens group Ge. For example, the final lens group Ge may be configured to include at least one positive lens, and may be configured such that a positive lens of the final lens group Ge closest to the object side is the LB lens. In such a case, it is possible to satisfactorily keep a balance of second-order on-axis chromatic aberration. Alternatively, the final lens group Ge may be configured to include at least one negative lens, and may be configured such that a negative lens of the final lens group Ge closest to the image side is the LB lens. In such a case, it is possible to satisfactorily keep a balance between second-order lateral chromatic aberration and second-order on-axis chromatic aberration.

Next, preferred configurations or available configurations common to the variable magnification optical system of the first embodiment and the variable magnification optical system of the second embodiment which are described above will be described. In the variable magnification optical systems of the first and second embodiments, it is preferable that the variable magnification lens group Gv includes at least one negative lens and at least one positive lens, and satisfies the following Conditional Expression (6) in a case where an average value of partial dispersion ratios between the g line and the F line of all the negative lenses within the variable magnification lens group Gv disposed closer to the object side than the positive lens of the variable magnification lens group Gv closest to the object side is set to θvnf. The value (θvnf) is not set to be equal to or less than the lower limit of Conditional Expression (6), and thus it is possible to suppress a fluctuation in second-order lateral chromatic aberration due to changing magnification. The value (θvnf) is not set to be equal to or less than the upper limit of Conditional Expression (6), and thus it is possible to suppress the generation of second-order on-axis chromatic aberration at the telephoto end. Meanwhile, in a case where the following Conditional Expression (6-1) is satisfied, it is possible to make characteristics more satisfactory.

$$0.58 < \theta vnf < 0.8 \quad (6)$$

$$0.58 < \theta vnf < 0.7 \quad (6\text{-}1)$$

In addition, in the variable magnification optical systems of the first and second embodiments, the first lens group G1 may be configured to remain stationary with respect to the image surface Sim during changing magnification. In this case, it is possible to reduce a shift in centroid due to changing magnification.

In the variable magnification optical systems of the first and second embodiments, the number of lens groups included in the intermediate group Gm is any number. For example, the intermediate group Gm may be configured to consist of one lens group having a negative refractive power. Such a configuration leads to the advantage of both an increase in angle and a high zoom ratio. Alternatively, the intermediate group Gm may be configured to consist of one lens group having a negative refractive power and one lens group having a positive refractive power. Such a configuration leads to the advantage of the suppression of a fluctuation in field curvature due to changing magnification. Alternatively, the intermediate group Gm may be configured to consist of two lens groups having a positive refractive power. Such a configuration leads to the advantage of high changing magnification.

In the variable magnification optical systems of the first and second embodiments, the intermediate group Gm may be configured to include a lens group that moves during changing magnification, may be configured to include a lens group that remains stationary with respect to the image surface Sim during changing magnification, or may be configured to include both a lens group that moves during changing magnification and a lens group that remains stationary with respect to the image surface Sim during changing magnification.

In the variable magnification optical systems of the first and second embodiments, the final lens group Ge may be configured to move during changing magnification. Alternatively, the final lens group Ge may be configured to remain stationary with respect to the image surface Sim during changing magnification. With such a configuration, it is possible to prevent dust or the like from infiltrating due to changing magnification.

The variable magnification optical systems of the first and second embodiments may be configured to include a lens group having a positive refractive power which moves during changing magnification between the first lens group G1 and the variable magnification lens group Gv. Alternatively, the variable magnification optical systems of the first and second embodiments may be configured to consist of the first lens group G1, the variable magnification lens group Gv, the intermediate group Gm, and the final lens group Ge. In order to achieve both high performance and a reduction in size, it is preferable that the variable magnification optical system is configured to consist of four or five lens groups.

The variable magnification optical systems of the first and second embodiments may be zoom lenses, or may be varifocal lenses. The LA lens and the LB lens described above may be the same lens, or may be lenses different from each other.

Preferred configurations and available configurations relating to the first embodiment and the second embodiment described above can be arbitrarily combined in each embodiment, and it is preferable that the configurations are appropriately selectively adopted in accordance with required specification. According to the first embodiment and the second embodiment, it is possible to realize a variable magnification optical system having high optical performance by various aberrations being satisfactorily corrected.

Next, numerical value examples of the variable magnification optical system of the present invention will be described.

Example 1

The cross-sectional view of a variable magnification optical system of Example 1 is shown in FIG. 1, and a method of illustration thereof is as described. Therefore, repeated description will be partially omitted herein. A variable magnification optical system of Example 1 is configured as four groups, and consists of a first lens group G1 having a positive refractive power, a second lens group G2 having a negative refractive power, a third lens group G3 having a negative refractive power, and a fourth lens group G4 having a positive refractive power, in order from the object side toward the image side. During changing magnification, the second lens group G2 and the third lens group G3 move in trajectories different from each other, and the first lens group G1 and the fourth lens group G4 remain stationary with respect to the image surface Sim. The second lens group G2 corresponds to the variable magnification lens group Gv. The third lens group G3 corresponds to the intermediate group Gm. The fourth lens group G4 corresponds to the final lens group Ge.

The first lens group G1 consists of eleven lenses. The second lens group G2 consists of six lenses, that is, lenses L21 to L26 in order from the object side toward the image side. The third lens group G3 consists of two lenses, that is, lenses L31 and L32 in order from the object side toward the image side. The fourth lens group G4 consists of an aperture stop St and nine lenses, that is, lenses L41 to L49 in order from the object side toward the image side. The lens L21 corresponds to the LA lens and the LB lens.

Table 1 shows basic lens data of the variable magnification optical system of Example 1, Table 2 shows specifications and variable surface distances, and Table 3 shows aspherical coefficients. In Table 1, the column of a surface number shows surface numbers in a case where the number is sequentially increased by one (1) toward the image side with the surface closest to the object side regarded as a first surface, the column of R shows the curvature radius of each surface, and the column of D shows a surface distance between each surface and a surface adjacent to the image side on the optical axis. In addition, the column of Nd shows the refractive index of each element at a d line (a wavelength of 587.6 nm (nanometer)), the column of νd shows the Abbe number of each element on the basis of the d line, and the column of θgF shows the partial dispersion ratio of each element between a g line (a wavelength of 435.8 nm (nanometer)) and an F line (a wavelength of 486.1 nm (nanometer)).

In Table 1, the sign of the curvature radius is set to be positive with respect to a surface shape with its convex surface toward the object side, and is set to be negative with respect to a surface shape with its convex surface toward the image side. Table 1 also shows the aperture stop St and the optical member PP together. In Table 1, a surface number and a term of (St) are written in the place of the surface number of a surface equivalent to the aperture stop St. The value in the lowermost place of D in Table 1 is a distance between the surface closest to the image side in the table and the image surface Sim. In Table 1, regarding the variable surface distance during changing magnification, the symbol of DD[ ] is used, and the surface number of this distance on the object side is attached to the inside of [ ] and is written in the column of D.

Table 2 shows values of a zoom ratio Zr, a focal length f, a back focus Bf in an air conversion length, an F-Number FNo., the maximum total angle of view 2ω, and variable surface distances, on the basis of the d line. (°) in the place of 2ω means that the unit thereof is a degree. In Table 2, respective values in a wide-angle end state, an intermediate focal length state, and a telephoto end state are shown in the places denoted by WIDE, MIDDLE, and TELE, respectively. The values of Table 1 and Table 2 are set to be in a state of being focused on an infinite object.

In Table 1, mark * is attached to the surface number of an aspherical surface, and the numerical values of a paraxial curvature radius are written in the column of the curvature radius of the aspherical surface. Table 3 shows the surface number of the aspherical surface and an aspherical coefficient relating to each aspherical surface. "E±n" (n is an integer) in the numerical values of the aspherical coefficients of Table 3 means "×10$^{±n}$". The aspherical coefficients are values of coefficients KA and Am (m=4, 6, 8, . . . ) in an aspherical expression represented by the following expression.

$$Zd = C \times h^2 / \{1 + (1 - KA \times C^2 \times h^2)^{1/2}\} + \Sigma Am \times h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis to a lens surface), C is a paraxial curvature, KA and Am are aspherical coefficients, and Σ in an aspherical expression means a total sum for m.

For data of each table, a degree is used as the unit of an angle, and mm (millimeter) is used as the unit of a length, but it is also possible to use other appropriate units since the optical system can be used even in a case where the system is magnified or reduced in proportion. In addition, each of the following tables describes numerical values rounded off to predetermined decimal places.

TABLE 1

Example 1

| Surface Number | R | D | Nd | νd | θgF |
|---|---|---|---|---|---|
| *1 | 652.30846 | 3.000 | 1.80100 | 34.97 | 0.58642 |
| 2 | 33.75950 | 17.000 | | | |
| *3 | 124.63661 | 2.000 | 1.49700 | 81.54 | 0.53748 |
| 4 | 56.38859 | 16.000 | | | |
| 5 | −72.12334 | 1.890 | 1.95375 | 32.32 | 0.59015 |
| 6 | −198.07683 | 0.300 | | | |
| 7 | 136.27157 | 6.589 | 1.84666 | 23.78 | 0.61923 |
| 8 | −278.19731 | 0.750 | | | |
| 9 | −2004.41018 | 6.299 | 1.53775 | 74.70 | 0.53936 |
| 10 | −94.36831 | 6.222 | | | |
| 11 | 113.96044 | 7.688 | 1.43875 | 94.66 | 0.53402 |
| *12 | −181.62730 | 4.123 | | | |
| 13 | −77.01334 | 1.800 | 1.80100 | 34.97 | 0.58642 |
| 14 | −126.15373 | 0.120 | | | |
| 15 | 185.80692 | 1.800 | 1.95375 | 32.32 | 0.59015 |
| 16 | 64.55320 | 16.657 | 1.43875 | 94.66 | 0.53402 |
| 17 | −57.19284 | 0.120 | | | |
| 18 | 253.63497 | 7.656 | 1.43387 | 95.18 | 0.53733 |
| 19 | −91.79709 | 0.120 | | | |
| 20 | 55.02016 | 4.523 | 1.72916 | 54.68 | 0.54451 |
| 21 | 96.38664 | DD [21] | | | |
| 22 | 38.79891 | 0.800 | 2.05090 | 26.94 | 0.60519 |
| 23 | 15.69576 | 4.865 | | | |
| 24 | −32.50768 | 0.800 | 1.87070 | 40.73 | 0.56825 |
| 25 | 85.93254 | 4.915 | 1.80518 | 25.42 | 0.61616 |
| 26 | −16.06678 | 0.810 | 1.77250 | 49.60 | 0.55212 |
| 27 | 72.79207 | 0.120 | | | |
| 28 | 34.10440 | 5.753 | 1.69895 | 30.13 | 0.60298 |
| 29 | −17.38443 | 0.800 | 1.95375 | 32.32 | 0.59015 |
| 30 | −77.23556 | DD [30] | | | |

TABLE 1-continued

Example 1

| Surface Number | R | D | Nd | νd | θgF |
|---|---|---|---|---|---|
| 31 | −33.53919 | 0.810 | 1.72916 | 54.68 | 0.54451 |
| 32 | 58.58500 | 2.398 | 1.84661 | 23.88 | 0.62072 |
| 33 | −1601.08632 | DD [33] | | | |
| 34(St) | ∞ | 1.000 | | | |
| *35 | 64.06267 | 5.685 | 1.80625 | 40.91 | 0.56920 |
| 36 | −74.87345 | 0.120 | | | |
| 37 | 130.80398 | 5.406 | 1.51742 | 52.43 | 0.55649 |
| 38 | −44.36621 | 1.000 | 1.95375 | 32.32 | 0.59015 |
| 39 | −230.37108 | 34.525 | | | |
| 40 | 263.63019 | 3.389 | 1.84661 | 23.88 | 0.62072 |
| 41 | −68.22276 | 1.362 | | | |
| 42 | 41.47814 | 6.117 | 1.58913 | 61.13 | 0.54067 |
| 43 | −52.11717 | 1.000 | 1.95375 | 32.32 | 0.59015 |
| 44 | 26.77920 | 1.468 | | | |
| 45 | 30.77223 | 9.606 | 1.53775 | 74.70 | 0.53936 |
| 46 | −26.15604 | 1.000 | 1.95375 | 32.32 | 0.59015 |
| 47 | −92.07402 | 0.120 | | | |
| 48 | 69.36894 | 5.672 | 1.48749 | 70.24 | 0.53007 |
| 49 | −36.08818 | 0.200 | | | |
| 50 | ∞ | 1.000 | 1.51633 | 64.14 | 0.53531 |
| 51 | ∞ | 5.419 | | | |
| 52 | ∞ | 33.000 | 1.60859 | 46.44 | 0.56664 |
| 53 | ∞ | 13.200 | 1.51633 | 64.05 | 0.53463 |
| 54 | ∞ | 5.481 | | | |

TABLE 2

Example 1

| | WIDE | MIDDLE | TELE |
|---|---|---|---|
| Zr | 1.0 | 4.0 | 12.6 |
| f | 4.668 | 18.532 | 58.584 |
| Bf | 40.980 | 40.980 | 40.980 |
| FNo. | 1.87 | 1.87 | 2.67 |
| 2ω(°) | 105.2 | 32.6 | 10.8 |
| DD [21] | 0.700 | 34.276 | 46.960 |
| DD [30] | 44.289 | 5.906 | 5.817 |
| DD [33] | 9.547 | 14.354 | 1.759 |

TABLE 3

Example 1

| | Surface Number | | | |
|---|---|---|---|---|
| | 1 | 3 | 12 | 35 |
| KA | 1.0000000E+00 | 1.0000000E+00 | 1.0000000E+00 | 1.0000000E+00 |
| A4 | 2.1935914E−06 | −4.8538826E−07 | 1.2228157E−06 | −2.8442470E−06 |
| A6 | −5.0559797E−10 | −7.7853267E−11 | −8.7891455E−11 | −7.4852926E−11 |
| A8 | 9.1907935E−14 | −1.8517438E−12 | −3.6792893E−13 | 2.5660359E−11 |
| A10 | −2.1402147E−17 | 2.7897779E−15 | 1.2054916E−15 | −3.2690705E−13 |
| A12 | 1.3105619E−20 | −5.6972175E−18 | −4.2351665E−18 | 2.5112033E−15 |
| A14 | −8.7349872E−25 | 1.1850253E−20 | 9.0596715E−21 | −1.1779146E−17 |
| A16 | −2.7360131E−27 | −1.3306389E−23 | −1.1002126E−23 | 3.2475561E−20 |
| A18 | 1.2785229E−30 | 7.2222926E−27 | 7.0252863E−27 | −4.8092671E−23 |
| A20 | −1.8338688E−34 | −1.5472028E−30 | −1.8328832E−30 | 2.9424421E−26 |

FIG. 9 shows a diagram of aberrations of the variable magnification optical system of Example 1 in a state of being focused on an infinite object, in order from the left side. In FIG. 9, spherical aberration, astigmatism, distortion, and lateral chromatic aberration are shown in order from the left side. In FIG. 9, aberrations in a wide-angle end state are shown on the upper portion to which WIDE is attached, aberrations in an intermediate focal length state are shown on the middle portion to which MIDDLE is attached, and aberrations in a telephoto end state are shown on the lower portion to which TELE is attached. In the spherical aberration diagram, aberrations at the d line (a wavelength of 587.6 nm (nanometer)), a C line (a wavelength of 656.3 nm (nanometer)), the F line (a wavelength of 486.1 nm (nanometer)), and the g line (a wavelength of 435.8 nm (nanometer)) are shown by a black solid line, a long dashed line, a short dashed line, and a dashed-two dotted line, respectively. In the astigmatism diagram, aberration at the d line in a sagittal direction is shown by a solid line, and aberration at the d line in a tangential direction is shown by a short dashed line. In the distortion diagram, aberration at the d line is shown by a solid line. In the lateral chromatic aberration diagram, aberrations at the C line, the F line, and the g line are shown by a long dashed line, a short dashed line, and a dashed-two dotted line, respectively. FNo. in the spherical aberration diagram means an F-Number, and ω in the other aberration diagrams means a half angle of view.

Symbols, meanings, description methods, and illustration methods of respective pieces of data relating to the variable magnification optical system of Example 1 described above are the same as those in the following examples unless otherwise noted, and thus the repeated description thereof will be omitted below.

Example 2

Figure 2:
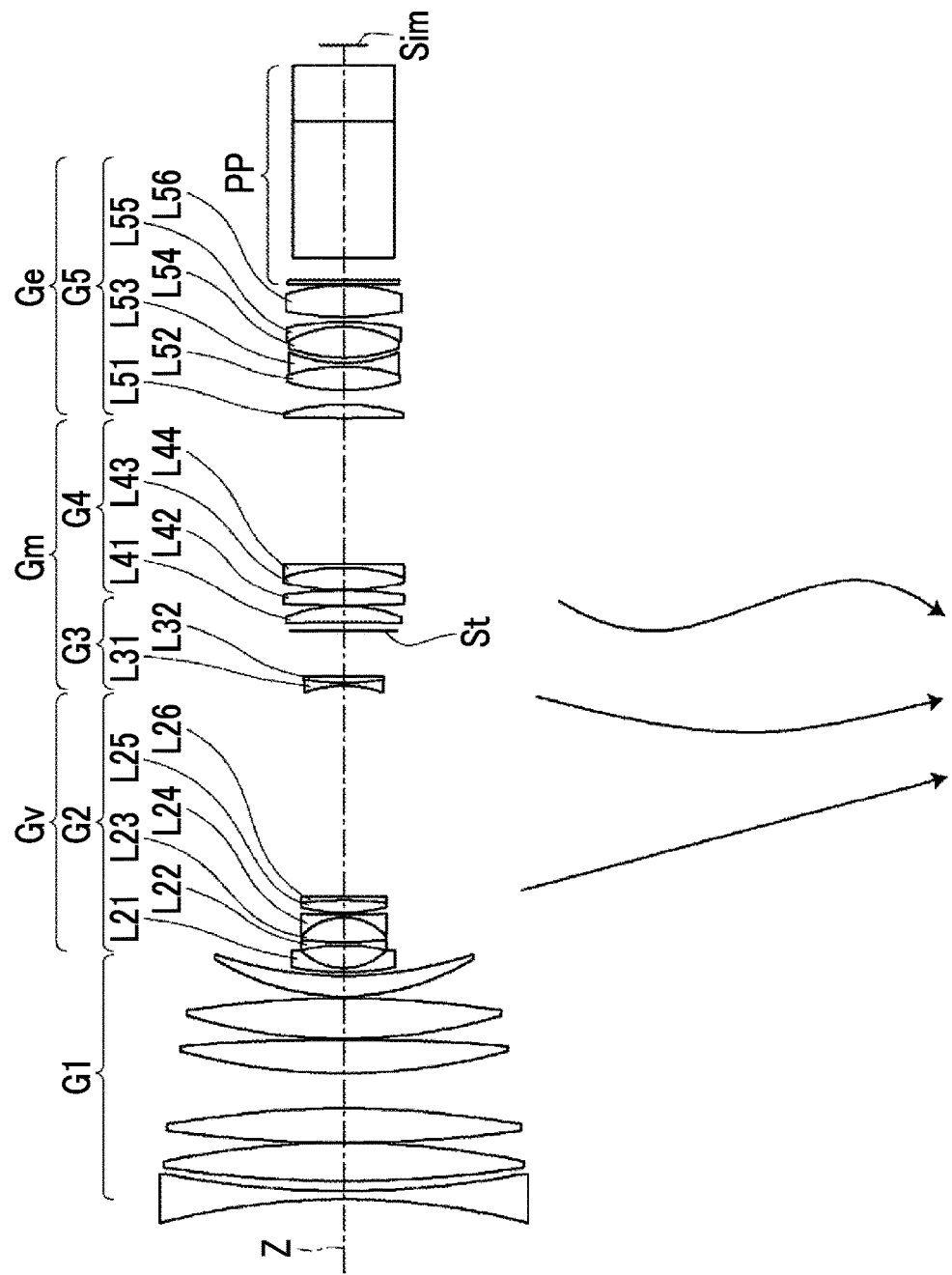
FIG. 2 is a cross-sectional view illustrating a configuration of a variable magnification optical system of Example 2 of the present invention.

FIG. 2 shows a cross-sectional view of a variable magnification optical system of Example 2. The variable magnification optical system of Example 2 is configured as five groups, and consists of a first lens group G1 having a positive refractive power, a second lens group G2 having a negative refractive power, a third lens group G3 having a negative refractive power, a fourth lens group G4 having a positive refractive power, and a fifth lens group G5 having a positive refractive power, in order from the object side toward the image side. During changing magnification, the second lens group G2, the third lens group G3, and the fourth lens group G4 move in trajectories different from each other, and the first lens group G1 and the fifth lens group G5 remain stationary with respect to the image surface Sim. The second lens group G2 corresponds to the variable magnification lens group Gv. A group consisting of the third lens group G3 and the fourth lens group G4 corresponds to the intermediate group Gm. The fifth lens group G5 corresponds to the final lens group Ge.

The first lens group G1 consists of six lenses. The second lens group G2 consists of six lenses, that is, lenses L21 to L26 in order from the object side toward the image side. The third lens group G3 consists of two lenses, that is, lenses L31 and L32 in order from the object side toward the image side. The fourth lens group G4 consists of an aperture stop St and four lenses, that is, lenses L41 to L44 in order from the object side toward the image side. The fifth lens group G5 consists of six lenses, that is, lenses L51 to L56 in order from the object side toward the image side. The lens L21 corresponds to the LA lens and the LB lens.

Table 4 shows basic lens data of the variable magnification optical system of Example 2, Table 5 shows specifications and variable surface distances, Table 6 shows aspherical coefficients, and FIG. 10 shows a diagram of aberrations in a state of being focused on an infinite object.

TABLE 4

Example 2

| Surface Number | R | D | Nd | νd | θgF |
|---|---|---|---|---|---|
| 1 | −174.78583 | 2.000 | 1.85026 | 32.35 | 0.59472 |
| 2 | 227.30236 | 2.460 | | | |
| 3 | 300.06787 | 9.091 | 1.43387 | 95.18 | 0.53733 |
| 4 | −212.93188 | 0.120 | | | |
| 5 | 325.50491 | 8.164 | 1.43700 | 95.10 | 0.53364 |
| *6 | −220.62880 | 8.637 | | | |
| 7 | 148.89070 | 8.114 | 1.43387 | 95.18 | 0.53733 |
| 8 | −476.77200 | 0.120 | | | |
| 9 | 129.70692 | 9.693 | 1.43700 | 95.10 | 0.53364 |
| 10 | −254.74771 | 0.600 | | | |
| 11 | 58.34913 | 4.872 | 1.76385 | 48.49 | 0.55898 |
| 12 | 94.58043 | DD [12] | | | |
| *13 | 76.04394 | 0.900 | 2.05090 | 26.94 | 0.60519 |
| 14 | 14.61771 | 5.470 | | | |
| 15 | −46.84890 | 0.745 | 1.81600 | 46.62 | 0.55682 |
| 16 | 144.72094 | 6.006 | 1.85896 | 22.73 | 0.62844 |
| 17 | −13.71562 | 0.735 | 1.95375 | 32.32 | 0.59015 |
| 18 | 290.50421 | 0.343 | | | |
| 19 | 38.27544 | 3.018 | 1.78472 | 25.68 | 0.61621 |
| 20 | −79.84569 | 0.745 | 1.77250 | 49.60 | 0.55212 |
| 21 | 461.61690 | DD [21] | | | |
| 22 | −28.52502 | 0.745 | 1.85150 | 40.78 | 0.56958 |
| 23 | 69.68872 | 1.648 | 1.98613 | 16.48 | 0.66558 |
| 24 | −307.35275 | DD [24] | | | |
| 25(St) | ∞ | 1.943 | | | |
| 26 | −372.27272 | 3.954 | 1.58267 | 46.42 | 0.56716 |
| 27 | −37.94988 | 0.120 | | | |
| 28 | 260.63962 | 3.610 | 1.61293 | 37.00 | 0.58632 |
| 29 | −103.98102 | 0.120 | | | |
| 30 | 56.55036 | 5.609 | 1.51633 | 64.14 | 0.53531 |
| 31 | −45.32304 | 0.900 | 1.95375 | 32.32 | 0.59015 |
| 32 | −796.38315 | DD [32] | | | |
| 33 | 3908.50914 | 3.193 | 1.67270 | 32.10 | 0.59891 |
| 34 | −52.07417 | 3.346 | | | |
| 35 | 45.54099 | 5.762 | 1.48749 | 70.24 | 0.53007 |
| 36 | −45.55769 | 0.900 | 1.95375 | 32.32 | 0.59015 |
| 37 | 35.66701 | 1.278 | | | |
| 38 | 41.29991 | 7.442 | 1.53775 | 74.70 | 0.53936 |
| 39 | −26.83508 | 1.136 | 1.87070 | 40.73 | 0.56825 |
| 40 | −67.53218 | 1.200 | | | |
| 41 | 73.89348 | 7.613 | 1.54814 | 45.78 | 0.56859 |
| 42 | −45.56206 | 0.200 | | | |
| 43 | ∞ | 1.000 | 1.52780 | 58.67 | 0.55390 |
| 44 | ∞ | 5.419 | | | |
| 45 | ∞ | 33.000 | 1.60859 | 46.44 | 0.56664 |
| 46 | ∞ | 13.200 | 1.51633 | 64.05 | 0.53463 |
| 47 | ∞ | 5.025 | | | |

TABLE 5

Example 2

| | WIDE | MIDDLE | TELE |
|---|---|---|---|
| Zr | 1.0 | 5.5 | 23.1 |
| f | 8.090 | 44.821 | 186.971 |
| Bf | 40.519 | 40.519 | 40.519 |
| FNo. | 1.87 | 1.87 | 3.00 |
| 2ω(°) | 75.0 | 13.8 | 3.4 |
| DD [12] | 0.955 | 40.653 | 53.311 |
| DD [21] | 50.959 | 2.927 | 2.223 |
| DD [24] | 10.663 | 15.902 | 1.219 |
| DD [32] | 35.232 | 38.326 | 41.056 |

TABLE 6

Example 2

| | Surface Number | |
|---|---|---|
| | 6 | 13 |
| KA | 1.0000000E+00 | 1.0000000E+00 |
| A4 | 1.0273724E−07 | 4.6625688E−06 |
| A6 | 2.7307824E−11 | −1.4780983E−08 |
| A8 | −7.3425543E−14 | 2.2859284E−10 |
| A10 | 1.6502042E−16 | −7.0454738E−12 |
| A12 | −2.2720607E−19 | 1.5874656E−13 |
| A14 | 1.9670710E−22 | −1.9160039E−15 |
| A16 | −1.0191553E−25 | 1.2380204E−17 |
| A18 | 2.8430201E−29 | −4.0775921E−20 |
| A20 | −3.2498244E−33 | 5.3708373E−23 |

Example 3

Figure 3:
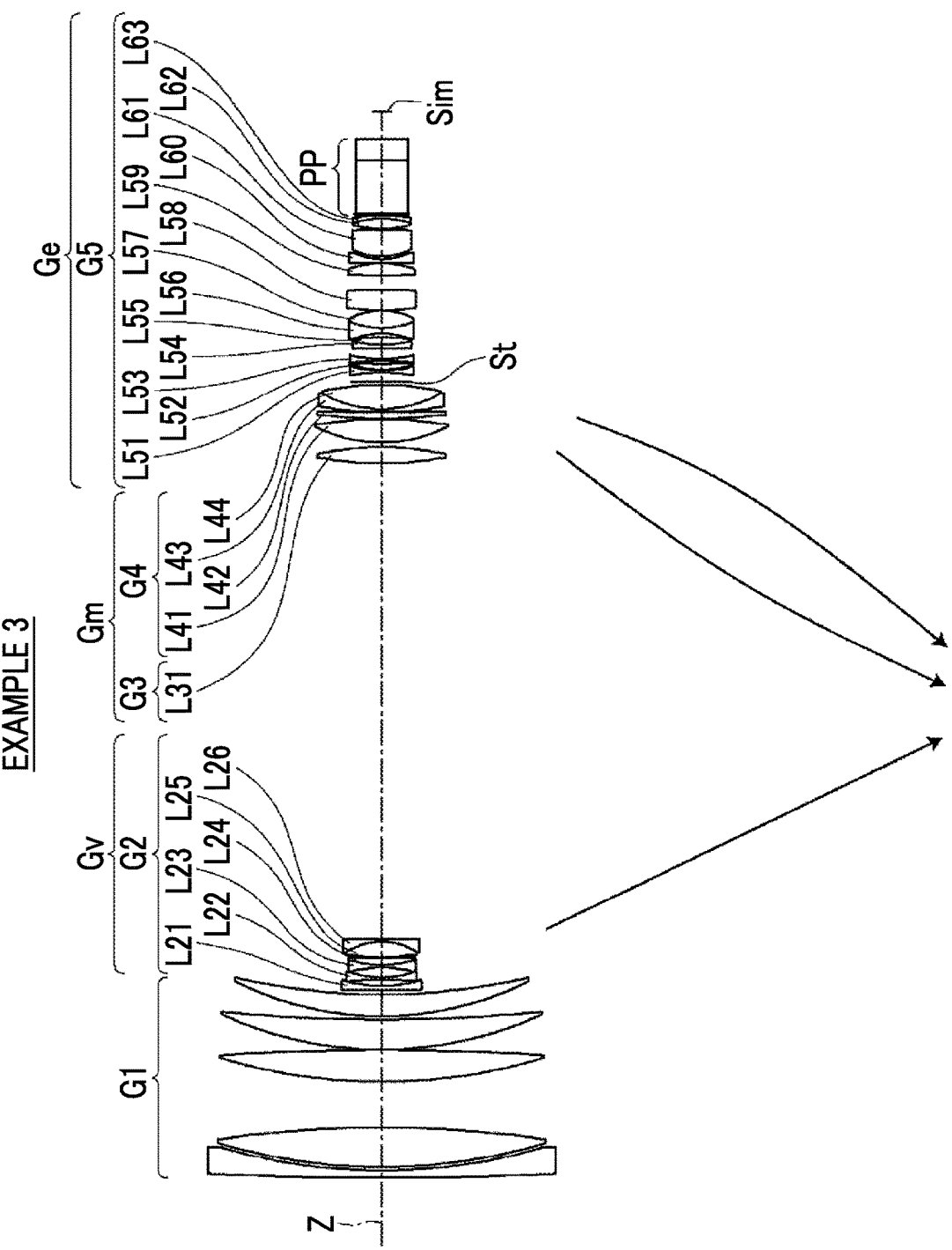
FIG. 3 is a cross-sectional view illustrating a configuration of a variable magnification optical system of Example 3 of the present invention.

FIG. 3 shows a cross-sectional view of a variable magnification optical system of Example 3. The variable magnification optical system of Example 3 is configured as five groups, and consists of a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, in order from the object side toward the image side. During changing magnification, the second lens group G2, the third lens group G3, and the fourth lens group G4 move in trajectories different from each other, and the first lens group G1 and the fifth lens group G5 remain stationary with respect to the image surface Sim. The second lens group G2 corresponds to the variable magnification lens group Gv. A group consisting of the third lens group G3 and the fourth lens group G4 corresponds to the intermediate group Gm. The fifth lens group G5 corresponds to the final lens group Ge.

The first lens group G1 consists of five lenses. The second lens group G2 consists of six lenses, that is, lenses L21 to L26 in order from the object side toward the image side. The third lens group G3 consists of one lens, that is, a lens L31. The fourth lens group G4 consists of four lenses, that is, lenses L41 to L44 in order from the object side toward the image side. The fifth lens group G5 consists of an aperture stop St and thirteen lenses, that is, lenses L51 to L63 in order from the object side toward the image side. The lens L22 corresponds to the LA lens and the LB lens.

Table 7 shows basic lens data of the variable magnification optical system of Example 3, Table 8 shows specifications and variable surface distances, Table 9 shows aspherical coefficients, and FIG. 11 shows a diagram of aberrations in a state of being focused on an infinite object.

TABLE 7

Example 3

| Surface Number | R | D | Nd | νd | θgF |
|---|---|---|---|---|---|
| 1 | 2485.87371 | 4.400 | 1.83400 | 37.16 | 0.57759 |
| 2 | 344.89370 | 2.260 | | | |
| 3 | 347.54017 | 24.841 | 1.43387 | 95.18 | 0.53733 |
| 4 | −682.45440 | 28.409 | | | |
| 5 | 346.10704 | 19.757 | 1.43387 | 95.18 | 0.53733 |
| 6 | −1499.86797 | 0.110 | | | |
| 7 | 233.99949 | 18.656 | 1.43387 | 95.18 | 0.53733 |
| 8 | 987.76179 | 2.110 | | | |
| 9 | 199.61148 | 13.550 | 1.43875 | 94.94 | 0.53433 |
| 10 | 395.81043 | DD [10] | | | |
| *11 | 65820.93248 | 2.800 | 1.90366 | 31.31 | 0.59481 |
| 12 | 81.25143 | 3.623 | | | |
| 13 | −340.73409 | 1.700 | 2.05090 | 26.94 | 0.60519 |
| 14 | 61.98534 | 6.076 | | | |
| 15 | −79.48445 | 1.700 | 1.87070 | 40.73 | 0.56825 |
| 16 | 69.54020 | 4.771 | 1.80809 | 22.76 | 0.63073 |
| 17 | −484.87115 | 0.120 | | | |
| 18 | 184.84837 | 9.640 | 1.80809 | 22.76 | 0.63073 |
| 19 | −38.29774 | 1.700 | 1.81600 | 46.62 | 0.55682 |
| 20 | −1208.32686 | DD [20] | | | |
| 21 | 221.00149 | 9.912 | 1.49700 | 81.54 | 0.53748 |
| *22 | −179.89604 | DD [22] | | | |
| 23 | 90.01640 | 14.386 | 1.43700 | 95.10 | 0.53364 |
| 24 | −254.48396 | 0.250 | | | |
| *25 | 218.37699 | 4.044 | 1.43700 | 95.10 | 0.53364 |
| 26 | 1850.35004 | 0.120 | | | |
| 27 | 211.52473 | 2.000 | 1.80000 | 29.84 | 0.60178 |
| 28 | 72.92735 | 15.203 | 1.43700 | 95.10 | 0.53364 |
| 29 | −176.05182 | DD [29] | | | |
| 30(St) | ∞ | 5.752 | | | |
| 31 | −105.66905 | 1.500 | 1.77250 | 49.60 | 0.55212 |
| 32 | 84.12440 | 0.120 | | | |
| 33 | 55.42337 | 3.856 | 1.80518 | 25.46 | 0.61572 |
| 34 | 225.91191 | 1.753 | | | |
| 35 | −203.28077 | 1.500 | 1.48749 | 70.24 | 0.53007 |
| 36 | 90.65293 | 6.577 | | | |
| 37 | −1014.88278 | 1.800 | 1.80400 | 46.58 | 0.55730 |
| 38 | 61.22577 | 4.748 | 1.80518 | 25.43 | 0.61027 |
| 39 | −194.21700 | 2.474 | | | |
| 40 | −47.05438 | 3.487 | 1.88300 | 40.76 | 0.56679 |
| 41 | 52.10547 | 10.902 | 1.54072 | 47.23 | 0.56511 |
| 42 | −41.21095 | 0.120 | | | |
| 43 | 193.44824 | 12.659 | 1.83481 | 42.72 | 0.56486 |
| 44 | −425.64902 | 8.271 | | | |
| 45 | 509.75125 | 7.765 | 1.72916 | 54.68 | 0.54451 |
| 46 | −55.64499 | 0.120 | | | |
| 47 | 4245.10436 | 2.390 | 1.95375 | 32.32 | 0.59015 |
| 48 | 39.54379 | 1.674 | | | |
| 49 | 41.11880 | 16.819 | 1.56883 | 56.36 | 0.54890 |
| 50 | −253.92530 | 0.150 | | | |
| 51 | 61.79436 | 6.631 | 1.48749 | 70.24 | 0.53007 |
| 52 | −53.53981 | 1.800 | 1.95375 | 32.32 | 0.59015 |
| 53 | −118.07318 | 0.250 | | | |
| 54 | ∞ | 1.000 | 1.51633 | 64.14 | 0.53531 |
| 55 | ∞ | 33.000 | 1.60863 | 46.60 | 0.56787 |
| 56 | ∞ | 13.200 | 1.51633 | 64.14 | 0.53531 |
| 57 | ∞ | 17.318 | | | |

TABLE 8

Example 3

| | WIDE | MIDDLE | TELE |
|---|---|---|---|
| Zr | 1.0 | 16.0 | 103.0 |
| f | 8.691 | 139.056 | 895.170 |
| Bf | 47.448 | 47.448 | 47.448 |
| FNo. | 1.77 | 1.77 | 4.64 |
| 2ω(°) | 68.6 | 4.6 | 0.8 |

TABLE 8-continued

Example 3

| | WIDE | MIDDLE | TELE |
|---|---|---|---|
| DD [10] | 2.486 | 161.141 | 188.221 |
| DD [20] | 296.118 | 85.742 | 3.978 |
| DD [22] | 2.925 | 11.525 | 2.425 |
| DD [29] | 1.957 | 45.079 | 108.862 |

TABLE 9

Example 3

| | Surface Number | | |
|---|---|---|---|
| | 11 | 22 | 25 |
| KA | 1.0000000E+00 | 1.0000000E+00 | 1.0000000E+00 |
| A4 | 4.7013404E−07 | 1.4644574E−07 | −3.5951892E−07 |
| A6 | 5.3654744E−10 | −4.1147033E−10 | −6.2145783E−10 |
| A8 | −5.6996907E−12 | 1.1455076E−12 | 1.8373162E−12 |
| A10 | 3.2148542E−14 | −1.7560718E−15 | −3.2651597E−15 |
| A12 | −9.8555390E−17 | 1.6368068E−18 | 3.6738388E−18 |
| A14 | 1.4343913E−19 | −9.2267764E−22 | −2.6519239E−21 |
| A16 | −1.8432273E−23 | 2.9228018E−25 | 1.1923791E−24 |
| A18 | −1.8806831E−25 | −4.1714278E−29 | −3.0432734E−28 |
| A20 | 1.5139631E−28 | 7.8526941E−34 | 3.3691659E−32 |

Example 4

Figure 4:
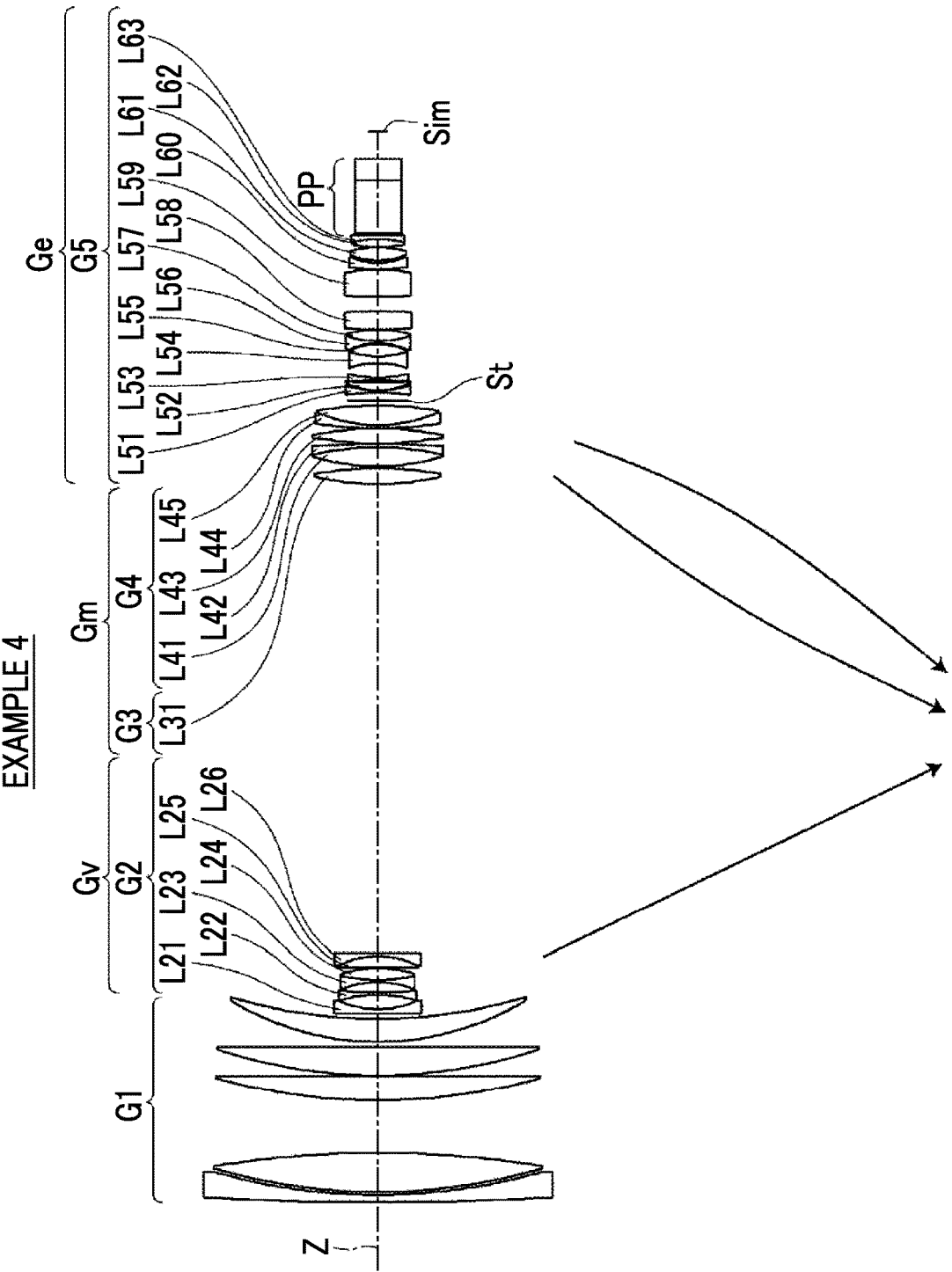
FIG. 4 is a cross-sectional view illustrating a configuration of a variable magnification optical system of Example 4 of the present invention.

FIG. 4 shows a cross-sectional view of a variable magnification optical system of Example 4. The variable magnification optical system of Example 4 is configured as five groups, and consists of a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, in order from the object side toward the image side. During changing magnification, the second lens group G2, the third lens group G3, and the fourth lens group G4 move in trajectories different from each other, and the first lens group G1 and the fifth lens group G5 remain stationary with respect to image surface Sim. The second lens group G2 corresponds to the variable magnification lens group Gv. A group consisting of the third lens group G3 and the fourth lens group G4 corresponds to the intermediate group Gm. The fifth lens group G5 corresponds to the final lens group Ge.

The first lens group G1 consists of five lenses. The second lens group G2 consists of six lenses, that is, lenses L21 to L26 in order from the object side toward the image side. The third lens group G3 consists of one lens, that is, a lens L31. The fourth lens group G4 consists of five lenses, that is, lenses L41 to L45 in order from the object side toward the image side. The fifth lens group G5 consists of thirteen lenses, that is, lenses L51 to L63 in order from the object side toward the image side. The lens L22 corresponds to the LA lens and the LB lens.

Table 10 shows basic lens data of the variable magnification optical system of Example 4, Table 11 shows specifications and variable surface distances, Table 12 shows aspherical coefficients, and FIG. 12 shows a diagram of aberrations in a state of being focused on an infinite object. Meanwhile, in the variable magnification optical systems of Examples 4 to 8, the aspherical coefficient of Am is set to Am (m=3, 4, 5, . . . ).

TABLE 10

Example 4

| Surface Number | R | D | N d | ν d | θgF |
|---|---|---|---|---|---|
| 1 | 2139.20464 | 4.400 | 1.83400 | 37.16 | 0.57759 |
| 2 | 364.30582 | 1.810 | | | |
| 3 | 356.91706 | 24.551 | 1.43387 | 95.18 | 0.53733 |
| 4 | −631.57954 | 32.845 | | | |
| 5 | 363.79098 | 15.620 | 1.43387 | 95.18 | 0.53733 |
| 6 | ∞ | 0.120 | | | |
| 7 | 311.12928 | 17.786 | 1.43387 | 95.18 | 0.53733 |
| 8 | ∞ | 3.056 | | | |
| 9 | 173.42618 | 14.344 | 1.43875 | 94.94 | 0.53433 |
| 10 | 312.38369 | DD [10] | | | |
| *11 | 17966.95009 | 2.800 | 1.90366 | 31.31 | 0.59481 |
| 12 | 58.23069 | 8.869 | | | |
| 13 | −84.20063 | 1.600 | 2.05090 | 26.94 | 0.60519 |
| 14 | 250.20063 | 6.140 | | | |
| 15 | −63.00625 | 1.600 | 1.91082 | 35.25 | 0.58224 |
| 16 | 110.07408 | 7.175 | 1.89286 | 20.36 | 0.63944 |
| 17 | −74.53383 | 0.120 | | | |
| 18 | 1221.00885 | 7.265 | 1.80518 | 25.43 | 0.61027 |
| 19 | −54.23486 | 1.620 | 1.80400 | 46.58 | 0.55730 |
| 20 | 2920.27855 | DD [20] | | | |
| 21 | 170.68085 | 9.716 | 1.49700 | 81.54 | 0.53748 |
| *22 | −212.21610 | DD [22] | | | |
| 23 | 138.38144 | 11.874 | 1.43700 | 95.10 | 0.53364 |
| 24 | −173.22291 | 2.000 | 1.59270 | 35.31 | 0.59336 |
| 25 | −581.28066 | 0.250 | | | |
| *26 | 187.81525 | 9.376 | 1.43700 | 95.10 | 0.53364 |
| 27 | −193.09272 | 0.120 | | | |
| 28 | 247.72449 | 2.000 | 1.80000 | 29.84 | 0.60178 |
| 29 | 94.42421 | 12.124 | 1.43700 | 95.10 | 0.53364 |
| 30 | −218.10583 | DD [30] | | | |
| 31(St) | ∞ | 4.961 | | | |
| 32 | −181.31491 | 1.400 | 1.77250 | 49.60 | 0.55212 |
| 33 | 60.63617 | 0.120 | | | |
| 34 | 43.81200 | 4.595 | 1.80518 | 25.42 | 0.61616 |
| 35 | 161.88836 | 1.998 | | | |
| 36 | −184.72282 | 1.400 | 1.48749 | 70.24 | 0.53007 |
| 37 | 76.63980 | 8.804 | | | |
| 38 | −59.38625 | 4.994 | 1.80440 | 39.59 | 0.57297 |
| 39 | 63.68731 | 7.570 | 1.80518 | 25.43 | 0.61027 |
| 40 | −40.94272 | 0.490 | | | |
| 41 | −40.49943 | 1.400 | 1.90366 | 31.31 | 0.59481 |
| 42 | 62.39355 | 6.890 | 1.65844 | 50.88 | 0.55612 |
| 43 | −77.98989 | 0.120 | | | |
| 44 | 182.62295 | 11.637 | 1.67300 | 38.26 | 0.57580 |
| 45 | −182.62295 | 8.122 | | | |
| 46 | 203.98021 | 17.104 | 1.63854 | 55.38 | 0.54858 |
| 47 | −96.66561 | 0.120 | | | |
| 48 | 134.93934 | 3.934 | 1.90366 | 31.31 | 0.59481 |
| 49 | 40.93543 | 1.363 | | | |
| 50 | 41.90518 | 8.180 | 1.51633 | 64.14 | 0.53531 |
| 51 | −68.68543 | 0.120 | | | |
| 52 | 68.70379 | 4.996 | 1.48749 | 70.24 | 0.53007 |
| 53 | −68.70379 | 2.400 | 1.91082 | 35.25 | 0.58224 |
| 54 | ∞ | 0.250 | | | |
| 55 | ∞ | 1.000 | 1.51633 | 64.14 | 0.53531 |
| 56 | ∞ | 33.000 | 1.60863 | 46.60 | 0.56787 |
| 57 | ∞ | 13.200 | 1.51633 | 64.14 | 0.53531 |
| 58 | ∞ | 17.329 | | | |

TABLE 11

Example 4

| | WIDE | MIDDLE | TELE |
|---|---|---|---|
| Zr | 1.0 | 16.0 | 77.0 |
| f | 9.297 | 148.750 | 715.862 |
| Bf | 47.459 | 47.459 | 47.459 |
| FNo. | 1.76 | 1.76 | 3.64 |
| 2ω(°) | 65.0 | 4.2 | 0.8 |
| DD [10] | 3.171 | 165.977 | 191.528 |
| DD [20] | 291.733 | 76.414 | 4.280 |
| DD [22] | 1.250 | 8.993 | 1.994 |
| DD [30] | 3.168 | 47.939 | 101.521 |

TABLE 12

Example 4

| | Surface Number | | |
|---|---|---|---|
| | 11 | 22 | 26 |
| KA | 1.0000000E+00 | 1.0000000E+00 | 1.0000000E+00 |
| A3 | −1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463314E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Example 5

Figure 5:
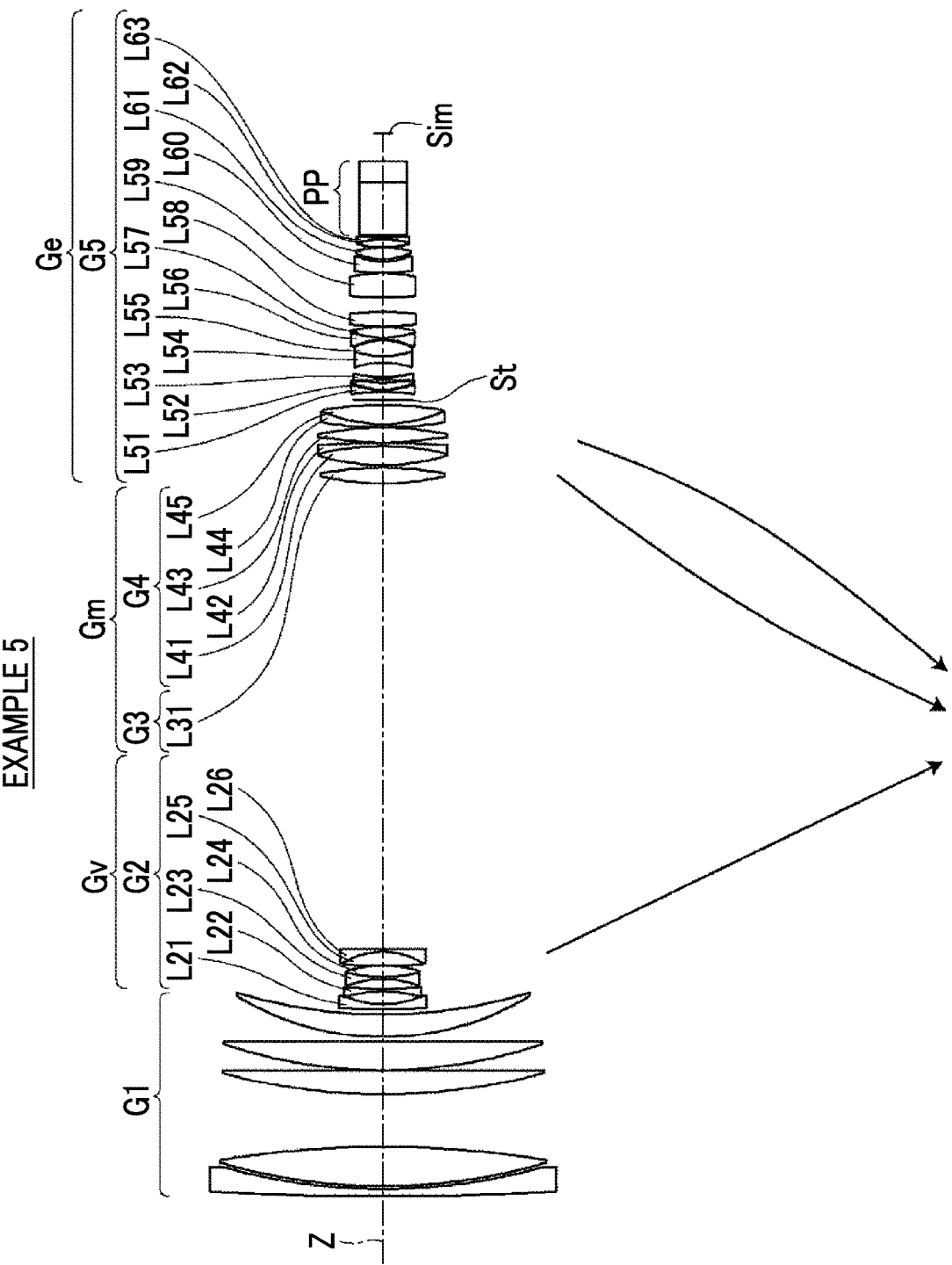
FIG. 5 is a cross-sectional view illustrating a configuration of a variable magnification optical system of Example 5 of the present invention.

FIG. 5 shows a cross-sectional view of a variable magnification optical system of Example 5. The variable magnification optical system of Example 5 is configured as five groups, and consists of a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, in order from the object side toward the image side. During changing magnification, the second lens group G2, the third lens group G3, and the fourth lens group G4 move in trajectories different from each other, and the first lens group G1 and the fifth lens group G5 remain stationary with respect to the image surface Sim. The second lens group G2 corresponds to the variable magnification lens group Gv. A group consisting of the third lens group G3 and the fourth lens group G4 corresponds to the intermediate group Gm. The fifth lens group G5 corresponds to the final lens group Ge.

The first lens group G1 consists of five lenses. The second lens group G2 consists of six lenses, that is, lenses L21 to L26 in order from the object side toward the image side. The third lens group G3 consists of one lens, that is, a lens L31. The fourth lens group G4 consists of five lenses, that is, lenses L41 to L45 in order from the object side toward the image side. The fifth lens group G5 consists of thirteen lenses, that is, lenses L51 to L63 in order from the object side toward the image side. The lens L22 corresponds to the LA lens.

Table 13 shows basic lens data of the variable magnification optical system of Example 5, Table 14 shows specifications and variable surface distances, Table 15 shows aspherical coefficients, and FIG. 13 shows a diagram of aberrations in a state of being focused on an infinite object.

TABLE 13

Example 5

| Surface Number | R | D | Nd | νd | θgF |
|---|---|---|---|---|---|
| 1 | 2242.11178 | 4.400 | 1.83400 | 37.16 | 0.57759 |
| 2 | 367.01188 | 1.810 | | | |
| 3 | 359.46856 | 24.553 | 1.43387 | 95.18 | 0.53733 |
| 4 | −621.44619 | 32.823 | | | |
| 5 | 368.35084 | 15.426 | 1.43387 | 95.18 | 0.53733 |
| 6 | ∞ | 0.120 | | | |
| 7 | 307.37997 | 17.988 | 1.43387 | 95.18 | 0.53733 |
| 8 | ∞ | 2.942 | | | |
| 9 | 173.03713 | 14.261 | 1.43875 | 94.94 | 0.53433 |
| 10 | 309.10874 | DD [10] | | | |
| *11 | 94303.13646 | 2.800 | 1.90366 | 31.31 | 0.59481 |
| 12 | 57.23672 | 8.057 | | | |
| 13 | −83.30682 | 1.600 | 2.00330 | 28.27 | 0.59802 |
| 14 | 229.44583 | 6.033 | | | |
| 15 | −63.50207 | 1.600 | 1.91650 | 31.60 | 0.59117 |
| 16 | 114.67667 | 7.035 | 1.89286 | 20.36 | 0.63944 |
| 17 | −75.98146 | 0.120 | | | |
| 18 | 886.27745 | 8.458 | 1.80518 | 25.43 | 0.61027 |
| 19 | −46.82158 | 1.620 | 1.80400 | 46.58 | 0.55730 |
| 20 | 2434.25484 | DD [20] | | | |
| 21 | 171.49141 | 9.695 | 1.49700 | 81.54 | 0.53748 |
| *22 | −212.09017 | DD [22] | | | |
| 23 | 137.94963 | 11.914 | 1.43700 | 95.10 | 0.53364 |
| 24 | −172.42266 | 2.000 | 1.59270 | 35.31 | 0.59336 |
| 25 | −570.82483 | 0.250 | | | |
| *26 | 189.18907 | 9.381 | 1.43700 | 95.10 | 0.53364 |
| 27 | −191.31039 | 0.120 | | | |
| 28 | 246.82238 | 2.000 | 1.80000 | 29.84 | 0.60178 |
| 29 | 94.71977 | 11.983 | 1.43700 | 95.10 | 0.53364 |
| 30 | −221.37490 | DD [30] | | | |
| 31(St) | ∞ | 4.899 | | | |
| 32 | −181.39503 | 1.400 | 1.77250 | 49.60 | 0.55212 |
| 33 | 61.08763 | 0.120 | | | |
| 34 | 44.43583 | 4.433 | 1.80518 | 25.42 | 0.61616 |
| 35 | 151.65947 | 2.073 | | | |
| 36 | −185.53885 | 1.400 | 1.48749 | 70.24 | 0.53007 |
| 37 | 84.07257 | 8.897 | | | |
| 38 | −60.21112 | 4.846 | 1.80440 | 39.59 | 0.57297 |
| 39 | 63.25976 | 9.624 | 1.80518 | 25.43 | 0.61027 |
| 40 | −40.94699 | 0.497 | | | |
| 41 | −40.24741 | 1.400 | 1.90366 | 31.31 | 0.59481 |
| 42 | 64.31140 | 6.758 | 1.65844 | 50.88 | 0.55612 |
| 43 | −80.39440 | 0.120 | | | |
| 44 | 190.44586 | 9.000 | 1.67300 | 38.26 | 0.57580 |
| 45 | −190.44586 | 9.032 | | | |
| 46 | 194.09993 | 15.279 | 1.63854 | 55.38 | 0.54858 |
| 47 | −96.14438 | 0.120 | | | |
| 48 | 138.59951 | 7.374 | 1.90366 | 31.31 | 0.59481 |
| 49 | 40.89512 | 1.652 | | | |
| 50 | 42.23419 | 7.190 | 1.51633 | 64.14 | 0.53531 |
| 51 | −67.55907 | 0.120 | | | |
| 52 | 67.37728 | 5.069 | 1.48749 | 70.24 | 0.53007 |
| 53 | −67.37728 | 1.400 | 1.91082 | 35.25 | 0.58224 |
| 54 | ∞ | 0.250 | | | |
| 55 | ∞ | 1.000 | 1.51633 | 64.14 | 0.53531 |
| 56 | ∞ | 33.000 | 1.60863 | 46.60 | 0.56787 |
| 57 | ∞ | 13.200 | 1.51633 | 64.14 | 0.53531 |
| 58 | ∞ | 17.326 | | | |

TABLE 14

Example 5

| | WIDE | MIDDLE | TELE |
|---|---|---|---|
| Zr | 1.0 | 16.0 | 77.0 |
| f | 9.297 | 148.745 | 715.835 |
| Bf | 47.456 | 47.456 | 47.456 |
| FNo. | 1.76 | 1.76 | 3.64 |
| 2ω(°) | 65.0 | 4.2 | 0.8 |
| DD [10] | 3.518 | 166.549 | 192.258 |
| DD [20] | 291.184 | 75.959 | 4.055 |
| DD [22] | 1.692 | 8.952 | 1.992 |
| DD [30] | 3.081 | 48.014 | 101.169 |

TABLE 15

Example 5

| | Surface Number | | |
|---|---|---|---|
| | 11 | 22 | 26 |
| KA | 1.0000000E+00 | 1.0000000E+00 | 1.0000000E+00 |
| A3 | −1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463314E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Example 6

Figure 6:
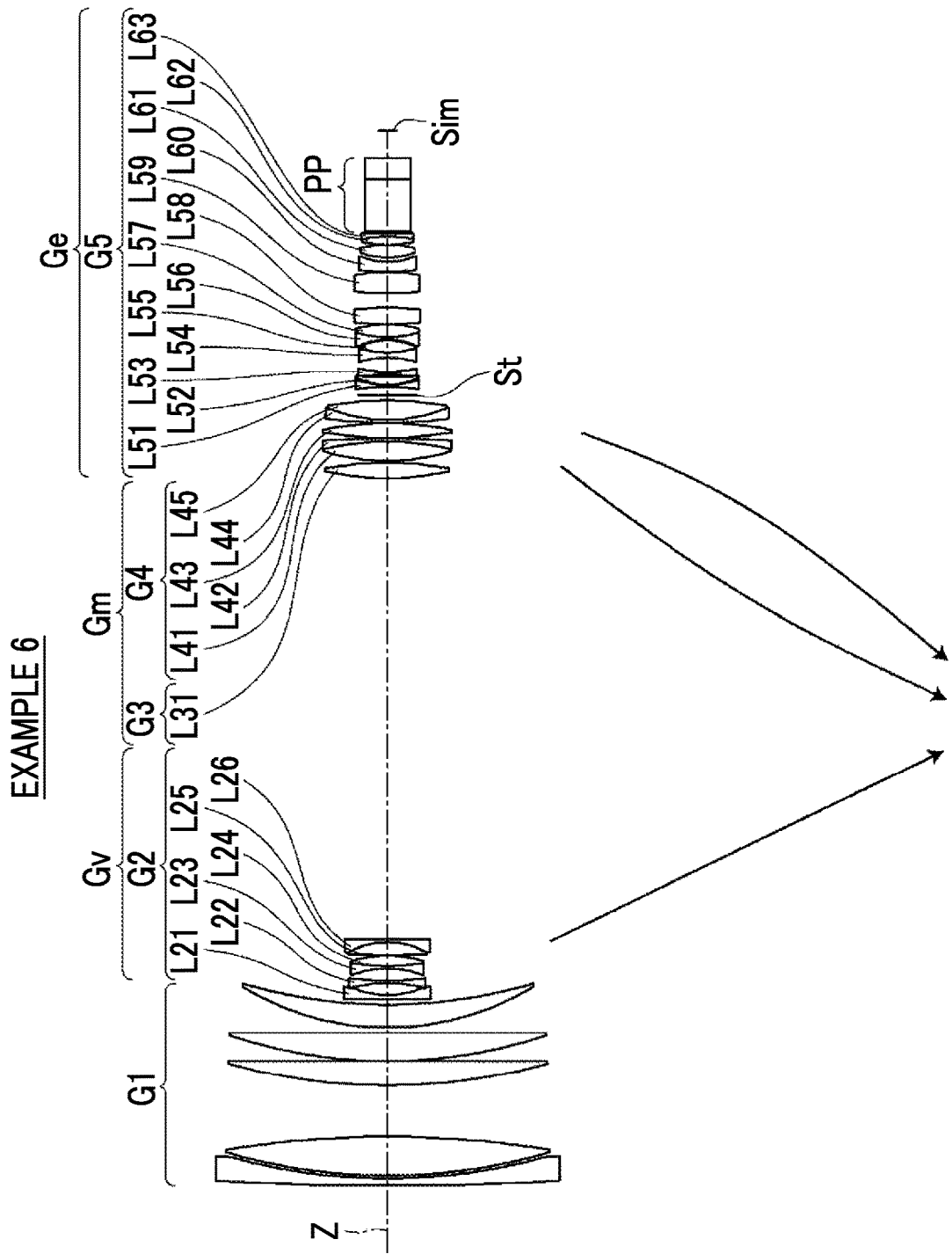
FIG. 6 is a cross-sectional view illustrating a configuration of a variable magnification optical system of Example 6 of the present invention.

FIG. 6 shows a cross-sectional view of a variable magnification optical system of Example 6. The variable magnification optical system of Example 6 is configured as five groups, and consists of a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, in order from the object side toward the image side. During changing magnification, the second lens group G2, the third lens group G3, and the fourth lens group G4 move in trajectories different from each other, and the first lens group G1 and the fifth lens group G5 remain stationary with respect to the image surface Sim. The second lens group G2 corresponds to the variable magnification lens group Gv. A group consisting of the third lens group G3 and the fourth lens group G4 corresponds to the intermediate group Gm. The fifth lens group G5 corresponds to the final lens group Ge.

The first lens group G1 consists of five lenses. The second lens group G2 consists of six lenses, that is, lenses L21 to L26 in order from the object side toward the image side. The third lens group G3 consists of one lens, that is, a lens L31. The fourth lens group G4 consists of five lenses, that is, lenses L41 to L45 in order from the object side toward the image side. The fifth lens group G5 consists of thirteen lenses, that is, lenses L51 to L63 in order from the object side toward the image side. The lens L22 corresponds to the LA lens. The lens L63 corresponds to the LB lens.

Table 16 shows basic lens data of the variable magnification optical system of Example 6, Table 17 shows specifications and variable surface distances, Table 18 shows aspherical coefficients, and FIG. 14 shows a diagram of aberrations in a state of being focused on an infinite object.

TABLE 16

Example 6

| Surface Number | R | D | Nd | νd | θgF |
|---|---|---|---|---|---|
| 1 | 2186.94121 | 4.400 | 1.83400 | 37.16 | 0.57759 |
| 2 | 366.76241 | 1.810 | | | |
| 3 | 359.61145 | 24.310 | 1.43387 | 95.18 | 0.53733 |
| 4 | −634.88384 | 32.792 | | | |
| 5 | 368.58995 | 15.396 | 1.43387 | 95.18 | 0.53733 |
| 6 | ∞ | 0.120 | | | |
| 7 | 308.67219 | 17.884 | 1.43387 | 95.18 | 0.53733 |
| 8 | ∞ | 3.590 | | | |
| 9 | 173.54728 | 14.511 | 1.43875 | 94.94 | 0.53433 |
| 10 | 316.70030 | DD [10] | | | |
| *11 | 6132.45070 | 2.800 | 1.90366 | 31.31 | 0.59481 |
| 12 | 56.78848 | 7.642 | | | |
| 13 | −82.43906 | 1.600 | 2.00330 | 28.27 | 0.59802 |
| 14 | 221.81426 | 7.322 | | | |
| 15 | −63.21846 | 1.600 | 1.91650 | 31.60 | 0.59117 |
| 16 | 127.11097 | 6.672 | 1.89286 | 20.36 | 0.63944 |
| 17 | −75.03950 | 0.120 | | | |
| 18 | 613.68488 | 8.324 | 1.80518 | 25.43 | 0.61027 |
| 19 | −48.41260 | 1.620 | 1.80400 | 46.58 | 0.55730 |
| 20 | 1146.95975 | DD [20] | | | |
| 21 | 177.43277 | 9.623 | 1.49700 | 81.54 | 0.53748 |
| *22 | −205.76341 | DD [22] | | | |
| 23 | 135.92350 | 12.083 | 1.43700 | 95.10 | 0.53364 |
| 24 | −169.87132 | 2.000 | 1.59270 | 35.31 | 0.59336 |
| 25 | −562.96820 | 0.250 | | | |
| *26 | 190.26463 | 9.289 | 1.43700 | 95.10 | 0.53364 |
| 27 | −194.74797 | 0.120 | | | |
| 28 | 264.17514 | 2.000 | 1.80000 | 29.84 | 0.60178 |
| 29 | 96.80608 | 12.189 | 1.43700 | 95.10 | 0.53364 |
| 30 | −205.98418 | DD [30] | | | |
| 31(St) | ∞ | 4.894 | | | |
| 32 | −168.05419 | 1.400 | 1.77250 | 49.60 | 0.55212 |
| 33 | 58.95899 | 0.120 | | | |
| 34 | 44.11371 | 4.665 | 1.80518 | 25.42 | 0.61616 |
| 35 | 177.95267 | 1.921 | | | |
| 36 | −180.63131 | 1.400 | 1.48749 | 70.24 | 0.53007 |
| 37 | 83.87921 | 8.969 | | | |
| 38 | −59.15958 | 3.900 | 1.80440 | 39.59 | 0.57297 |
| 39 | 62.37391 | 7.641 | 1.80518 | 25.43 | 0.61027 |
| 40 | −40.70320 | 0.499 | | | |
| 41 | −40.08142 | 1.400 | 1.90366 | 31.31 | 0.59481 |
| 42 | 62.92231 | 8.020 | 1.65844 | 50.88 | 0.55612 |
| 43 | −78.68383 | 0.120 | | | |
| 44 | 183.33245 | 10.393 | 1.67300 | 38.26 | 0.57580 |
| 45 | −183.33245 | 9.167 | | | |
| 46 | 193.29391 | 13.307 | 1.63854 | 55.38 | 0.54858 |
| 47 | −97.54984 | 0.120 | | | |
| 48 | 132.17175 | 6.592 | 1.90366 | 31.31 | 0.59481 |
| 49 | 40.84078 | 2.673 | | | |
| 50 | 43.66628 | 8.250 | 1.51633 | 64.14 | 0.53531 |
| 51 | −69.29226 | 0.120 | | | |
| 52 | 73.65830 | 5.295 | 1.53172 | 48.84 | 0.56309 |
| 53 | −73.65830 | 1.823 | 2.05090 | 26.94 | 0.60519 |
| 54 | −1257.98633 | 0.250 | | | |
| 55 | ∞ | 1000 | 1.51633 | 64.14 | 0.53531 |
| 56 | ∞ | 33.000 | 1.60863 | 46.60 | 0.56787 |
| 57 | ∞ | 13.200 | 1.51633 | 64.14 | 0.53531 |
| 58 | ∞ | 17.312 | | | |

TABLE 17

Example 6

| | WIDE | MIDDLE | TELE |
|---|---|---|---|
| Zr | 1.0 | 16.0 | 77.0 |
| f | 9.295 | 148.712 | 715.678 |
| Bf | 47.442 | 47.442 | 47.442 |
| FNo. | 1.76 | 1.76 | 3.64 |
| 2ω(°) | 65.0 | 4.2 | 0.8 |
| DD [10] | 3.355 | 165.466 | 191.573 |
| DD [20] | 290.449 | 74.988 | 3.947 |
| DD [22] | 1.251 | 8.929 | 1.969 |
| DD [30] | 3.412 | 49.086 | 100.979 |

TABLE 18

Example 6

| Surface Number | | | |
|---|---|---|---|
| | 11 | 22 | 26 |
| KA | 1.0000000E+00 | 1.0000000E+00 | 1.0000000E+00 |
| A3 | −1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463314E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Example 7

Figure 7:
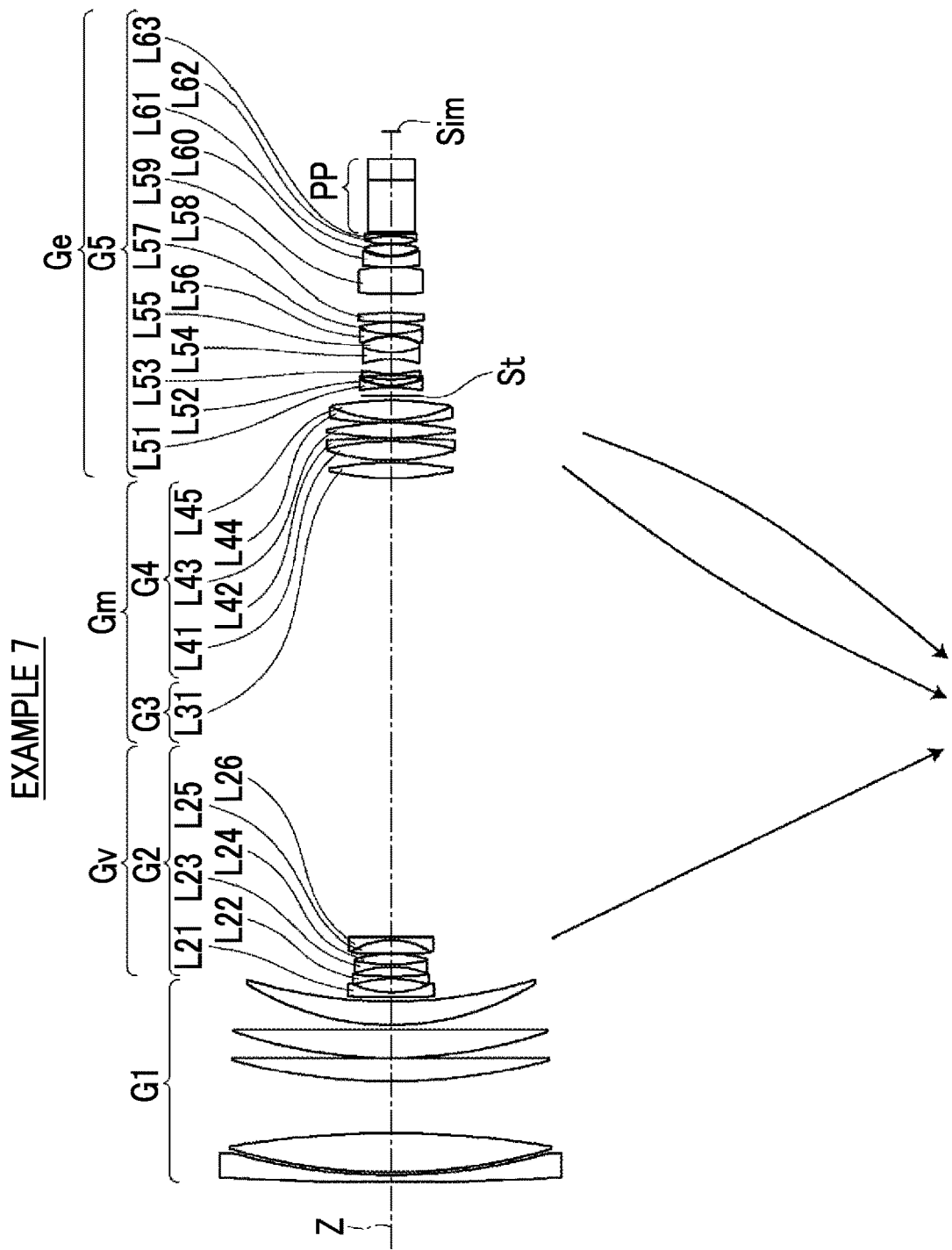
FIG. 7 is a cross-sectional view illustrating a configuration of a variable magnification optical system of Example 7 of the present invention.

FIG. 7 shows a cross-sectional view of a variable magnification optical system of Example 7. The variable magnification optical system of Example 7 is configured as five groups, and consists of a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, in order from the object side toward the image side. During changing magnification, the second lens group G2, the third lens group G3, and the fourth lens group G4 move in trajectories different from each other, and the first lens group G1 and the fifth lens group G5 remain stationary with respect to the image surface Sim. The second lens group G2 corresponds to the variable magnification lens group Gv. A group consisting of the third lens group G3 and the fourth lens group G4 corresponds to the intermediate group Gm. The fifth lens group G5 corresponds to the final lens group Ge.

The first lens group G1 consists of five lenses. The second lens group G2 consists of six lenses, that is, lenses L21 to L26 in order from the object side toward the image side. The third lens group G3 consists of one lens, that is, a lens L31. The fourth lens group G4 consists of five lenses, that is, lenses L41 to L45 in order from the object side toward the image side. The fifth lens group G5 consists of thirteen lenses, that is, lenses L51 to L63 in order from the object side toward the image side. The lens L22 corresponds to the LA lens. The lens L52 corresponds to the LB lens.

Table 19 shows basic lens data of the variable magnification optical system of Example 7, Table 20 shows specifications and variable surface distances, Table 21 shows aspherical coefficients, and FIG. 15 shows a diagram of aberrations in a state of being focused on an infinite object.

TABLE 19

Example 7

| Surface Number | R | D | Nd | νd | θgF |
|---|---|---|---|---|---|
| 1 | 2228.04113 | 4.400 | 1.83400 | 37.16 | 0.57759 |
| 2 | 367.06923 | 1.810 | | | |
| 3 | 359.40530 | 24.531 | 1.43387 | 95.18 | 0.53733 |
| 4 | −624.51654 | 32.826 | | | |
| 5 | 369.51550 | 15.356 | 1.43387 | 95.18 | 0.53733 |
| 6 | ∞ | 0.120 | | | |
| 7 | 307.14033 | 17.993 | 1.43387 | 95.18 | 0.53733 |
| 8 | ∞ | 2.968 | | | |
| 9 | 172.83233 | 14.896 | 1.43875 | 94.94 | 0.53433 |
| 10 | 308.57966 | DD [10] | | | |
| *11 | 26055.53774 | 2.800 | 1.90366 | 31.31 | 0.59481 |
| 12 | 57.34109 | 8.518 | | | |
| 13 | −83.37319 | 1.600 | 2.00330 | 28.27 | 0.59802 |
| 14 | 221.65394 | 6.135 | | | |
| 15 | −64.16739 | 1.600 | 1.91650 | 31.60 | 0.59117 |
| 16 | 114.88027 | 6.792 | 1.89286 | 20.36 | 0.63944 |
| 17 | −76.57136 | 0.120 | | | |
| 18 | 798.34352 | 8.549 | 1.80518 | 25.43 | 0.61027 |
| 19 | −46.55249 | 1.620 | 1.80400 | 46.58 | 0.55730 |
| 20 | 2609.74112 | DD [20] | | | |
| 21 | 174.27720 | 9.710 | 1.49700 | 81.54 | 0.53748 |
| *22 | −210.85880 | DD [22] | | | |
| 23 | 135.64760 | 12.185 | 1.43700 | 95.10 | 0.53364 |
| 24 | −169.54876 | 2.000 | 1.59270 | 35.31 | 0.59336 |
| 25 | −546.16756 | 0.250 | | | |
| *26 | 192.59440 | 9.318 | 1.43700 | 95.10 | 0.53364 |
| 27 | −190.90607 | 0.120 | | | |
| 28 | 248.17893 | 2.000 | 1.80000 | 29.84 | 0.60178 |
| 29 | 94.58806 | 12.062 | 1.43700 | 95.10 | 0.53364 |
| 30 | −220.54891 | DD [30] | | | |
| 31(St) | ∞ | 4.983 | | | |
| 32 | −154.51304 | 1.400 | 1.77250 | 49.60 | 0.55212 |
| 33 | 51.80272 | 0.120 | | | |
| 34 | 44.85375 | 3.969 | 2.05090 | 26.94 | 0.60519 |
| 35 | 115.69028 | 2.181 | | | |
| 36 | −255.89247 | 1.400 | 1.48749 | 70.24 | 0.53007 |
| 37 | 97.05197 | 8.874 | | | |
| 38 | −66.05306 | 4.986 | 1.80440 | 39.59 | 0.57297 |
| 39 | 56.34010 | 9.745 | 1.80518 | 25.43 | 0.61027 |
| 40 | −40.96802 | 0.473 | | | |
| 41 | −40.12265 | 1.400 | 1.90366 | 31.31 | 0.59481 |
| 42 | 60.99177 | 7.416 | 1.65844 | 50.88 | 0.55612 |
| 43 | −81.02404 | 0.120 | | | |
| 44 | 212.34105 | 5.980 | 1.67300 | 38.26 | 0.57580 |
| 45 | −212.34105 | 11.446 | | | |
| 46 | 200.81869 | 17.154 | 1.63854 | 55.38 | 0.54858 |
| 47 | −94.23167 | 0.120 | | | |
| 48 | 138.79283 | 6.473 | 1.90366 | 31.31 | 0.59481 |
| 49 | 41.16808 | 0.951 | | | |
| 50 | 41.35994 | 7.024 | 1.51633 | 64.14 | 0.53531 |
| 51 | −68.27531 | 0.120 | | | |
| 52 | 68.77618 | 4.978 | 1.48749 | 70.24 | 0.53007 |
| 53 | −68.77618 | 1.400 | 1.91082 | 35.25 | 0.58224 |
| 54 | ∞ | 0.250 | | | |
| 55 | ∞ | 1.000 | 1.51633 | 64.14 | 0.53531 |
| 56 | ∞ | 33.000 | 1.60863 | 46.60 | 0.56787 |
| 57 | ∞ | 13.200 | 1.51633 | 64.14 | 0.53531 |
| 58 | ∞ | 17.322 | | | |

TABLE 20

Example 7

| | WIDE | MIDDLE | TELE |
|---|---|---|---|
| Zr | 1.0 | 16.0 | 77.0 |
| f | 9.296 | 148.738 | 715.803 |
| Bf | 47.452 | 47.452 | 47.452 |
| FNo. | 1.76 | 1.76 | 3.64 |
| 2ω(°) | 65.0 | 4.2 | 0.8 |
| DD [10] | 2.869 | 165.532 | 191.527 |
| DD [20] | 290.726 | 75.328 | 3.980 |

TABLE 20-continued

Example 7

| | WIDE | MIDDLE | TELE |
|---|---|---|---|
| DD [22] | 1.565 | 8.918 | 1.922 |
| DD [30] | 3.034 | 48.415 | 100.765 |

TABLE 21

Example 7

| | Surface Number | | |
|---|---|---|---|
| | 11 | 22 | 26 |
| KA | 1.0000000E+00 | 1.0000000E+00 | 1.0000000E+00 |
| A3 | −1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463314E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Example 8

Figure 8:
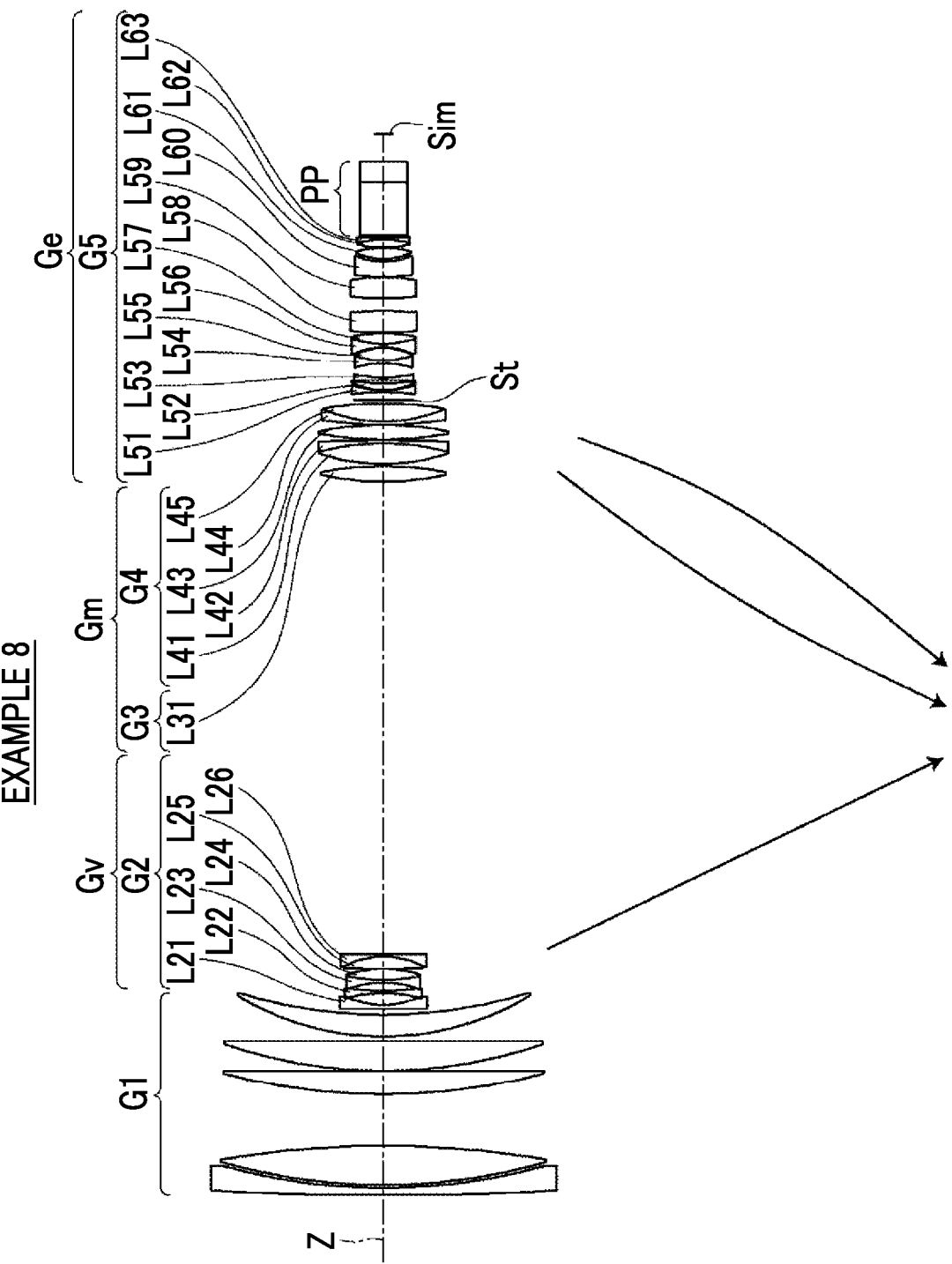
FIG. 8 is a cross-sectional view illustrating a configuration of a variable magnification optical system of Example 8 of the present invention.

FIG. 8 shows a cross-sectional view of a variable magnification optical system of Example 8. The variable magnification optical system of Example 8 is configured as five groups, and consists of a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, in order from the object side toward the image side. During changing magnification, the second lens group G2, the third lens group G3, and the fourth lens group G4 move in trajectories different from each other, and the first lens group G1 and the fifth lens group G5 remain stationary with respect to the image surface Sim. The second lens group G2 corresponds to the variable magnification lens group Gv. A group consisting of the third lens group G3 and the fourth lens group G4 corresponds to the intermediate group Gm. The fifth lens group G5 corresponds to the final lens group Ge.

The first lens group G1 consists of five lenses. The second lens group G2 consists of six lenses, that is, lenses L21 to L26 in order from the object side toward the image side. The third lens group G3 consists of one lens, that is, a lens L31. The fourth lens group G4 consists of five lenses, that is, lenses L41 to L45 in order from the object side toward the image side. The fifth lens group G5 consists of thirteen lenses, that is, lenses L51 to L63 in order from the object side toward the image side. The lens L22 and the lens L44 correspond to the LA lens. The lens L44 corresponds to the LB lens.

Table 22 shows basic lens data of the variable magnification optical system of Example 8, Table 23 shows specifications and variable surface distances, Table 24 shows aspherical coefficients, and FIG. 16 shows a diagram of aberrations in a state of being focused on an infinite object.

TABLE 22

Example 8

| Surface Number | R | D | Nd | νd | θgF |
|---|---|---|---|---|---|
| 1 | 2341.52765 | 4.400 | 1.83400 | 37.16 | 0.57759 |
| 2 | 370.74511 | 1.810 | | | |
| 3 | 361.75048 | 24.411 | 1.43387 | 95.18 | 0.53733 |
| 4 | −613.06146 | 32.681 | | | |
| 5 | 384.06909 | 14.731 | 1.43387 | 95.18 | 0.53733 |
| 6 | ∞ | 0.120 | | | |
| 7 | 299.44110 | 18.371 | 1.43387 | 95.18 | 0.53733 |
| 8 | ∞ | 3.195 | | | |
| 9 | 173.87588 | 13.692 | 1.43875 | 94.94 | 0.53433 |
| 10 | 303.78007 | DD [10] | | | |
| *11 | −2777777.77778 | 2.800 | 1.90366 | 31.31 | 0.59481 |
| 12 | 58.15885 | 7.102 | | | |
| 13 | −88.26410 | 1.600 | 2.00330 | 28.27 | 0.59802 |
| 14 | 192.25428 | 5.088 | | | |
| 15 | −62.04194 | 1.600 | 1.91650 | 31.60 | 0.59117 |
| 16 | 94.22893 | 7.203 | 1.89286 | 20.36 | 0.63944 |
| 17 | −75.05917 | 0.120 | | | |
| 18 | 673.91956 | 7.541 | 1.80518 | 25.43 | 0.61027 |
| 19 | −52.33776 | 1.620 | 1.80400 | 46.58 | 0.55730 |
| 20 | 5059.58566 | DD [20] | | | |
| 21 | 179.69971 | 9.722 | 1.49700 | 81.54 | 0.53748 |
| *22 | −188.03022 | DD [22] | | | |
| 23 | 123.45809 | 13.054 | 1.43700 | 95.10 | 0.53364 |
| 24 | −153.95948 | 2.000 | 1.59270 | 35.31 | 0.59336 |
| 25 | −737.02839 | 0.250 | | | |
| *26 | 175.64853 | 9.306 | 1.43700 | 95.10 | 0.53364 |
| 27 | −201.64141 | 0.120 | | | |
| 28 | 251.36711 | 2.000 | 2.05090 | 26.94 | 0.60519 |
| 29 | 97.59780 | 11.267 | 1.53172 | 48.84 | 0.56309 |
| 30 | −238.90648 | DD [30] | | | |
| 31(St) | ∞ | 4.705 | | | |
| 32 | −193.06031 | 1.400 | 1.77250 | 49.60 | 0.55212 |
| 33 | 64.73569 | 0.120 | | | |
| 34 | 45.25973 | 4.213 | 1.80518 | 25.42 | 0.61616 |
| 35 | 133.62499 | 2.287 | | | |
| 36 | −174.01273 | 1.400 | 1.48749 | 70.24 | 0.53007 |
| 37 | 88.24694 | 8.910 | | | |
| 38 | −60.44404 | 2.082 | 1.80440 | 39.59 | 0.57297 |
| 39 | 55.95349 | 7.891 | 1.80518 | 25.43 | 0.61027 |
| 40 | −40.80462 | 0.534 | | | |
| 41 | −40.09223 | 2.146 | 1.90366 | 31.31 | 0.59481 |
| 42 | 62.69037 | 6.807 | 1.65844 | 50.88 | 0.55612 |
| 43 | −79.09855 | 0.120 | | | |
| 44 | 195.79835 | 13.996 | 1.67300 | 38.26 | 0.57580 |
| 45 | −195.79835 | 7.925 | | | |
| 46 | 201.31186 | 13.282 | 1.63854 | 55.38 | 0.54858 |
| 47 | −93.62073 | 0.120 | | | |
| 48 | 139.12712 | 9.328 | 1.90366 | 31.31 | 0.59481 |
| 49 | 40.70591 | 1.803 | | | |
| 50 | 42.05995 | 6.965 | 1.51633 | 64.14 | 0.53531 |
| 51 | −66.27325 | 0.120 | | | |
| 52 | 66.17707 | 5.095 | 1.48749 | 70.24 | 0.53007 |
| 53 | −66.17707 | 1.400 | 1.91082 | 35.25 | 0.58224 |
| 54 | ∞ | 0.250 | | | |
| 55 | ∞ | 1.000 | 1.51633 | 64.14 | 0.53531 |
| 56 | ∞ | 33.000 | 1.60863 | 46.60 | 0.56787 |
| 57 | ∞ | 13.200 | 1.51633 | 64.14 | 0.53531 |
| 58 | ∞ | 17.250 | | | |

TABLE 23

Example 8

| | WIDE | MIDDLE | TELE |
|---|---|---|---|
| Zr | 1.0 | 16.0 | 77.0 |
| f | 9.294 | 148.703 | 715.634 |
| Bf | 47.380 | 47.380 | 47.380 |
| FNo. | 1.76 | 1.76 | 3.64 |
| 2ω(°) | 65.2 | 4.2 | 0.8 |
| DD [10] | 3.558 | 169.729 | 194.394 |
| DD [20] | 295.790 | 79.078 | 3.806 |
| DD [22] | 1.234 | 8.881 | 1.835 |
| DD [30] | 2.228 | 45.122 | 102.774 |

TABLE 24

Example 8

| | Surface Number | | |
|---|---|---|---|
| | 11 | 22 | 26 |
| KA | 1.0000000E+00 | 1.0000000E+00 | 1.0000000E+00 |
| A3 | −1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463314E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Table 25 shows values corresponding to the respective conditional expressions of the variable magnification optical systems of Examples 1 to 8. In Table 25, the signs of lenses corresponding to the places of the "LA lens" and "LB lens" are shown. Rows from (1) to (5A) located immediately below the row of the "LA lens" show values corresponding to Conditional Expressions (1) to (5A) relating to each LA lens. Rows from (1) to (5B) located immediately below the row of the "LB lens" show values corresponding to Conditional Expressions (1) to (5B) relating to each LB lens. Since Example 5 does not have lenses corresponding to the LB lens, "−" is written in the places relating to the LB lens of Example 5. Example 8 has two lenses, that is, lenses L22 and L44 as lenses corresponding to the "LA lens". Thus, within each frame of corresponding values, corresponding values relating to the lens L22 are shown at the upper portion, and corresponding values relating to the lens L44 are shown at the lower portion.

TABLE 25

| Expression Number | | Example 1 | Example 2 | Example 3 | Example 4 | Example 5 | Example 6 | Example 7 | Example 8 |
|---|---|---|---|---|---|---|---|---|---|
| | LA Lens | L21 | L21 | L22 | L22 | L22 | L22 | L22 | L22 L44 |
| (1) | Nd | 2.0509 | 2.0509 | 2.0509 | 2.0509 | 2.00330 | 2.00330 | 2.00330 | 2.0033 2.0509 |
| (2a) | νd | 26.94 | 26.94 | 26.94 | 26.94 | 28.27 | 28.27 | 28.27 | 28.27 26.94 |

TABLE 25-continued

| Expression Number | | Example 1 | Example 2 | Example 3 | Example 4 | Example 5 | Example 6 | Example 7 | Example 8 |
|---|---|---|---|---|---|---|---|---|---|
| (3) | $\theta gF + 0.00162 \times vd$ | 0.6488 | 0.6488 | 0.6488 | 0.6488 | 0.6438 | 0.6438 | 0.6438 | 0.6438 0.6488 |
| (4A) | fGA/fA | 0.6776 | 0.8865 | 0.5335 | 0.4844 | 0.4770 | 0.4824 | 0.4803 | 0.4953 −0.7544 |
| (5A) | $\Sigma(\theta gFai/fai) \times fGA$ | 0.5437 | 0.5572 | 0.5194 | 0.5498 | 0.5512 | 0.5511 | 0.5485 | 0.5638 0.2805 |
| | LB Lens | L21 | L21 | L22 | L22 | — | L63 | L52 | L44 |
| (1) | Nd | 2.0509 | 2.0509 | 2.0509 | 2.0509 | — | 2.05090 | 2.05090 | 2.05090 |
| (2b) | vd | 26.94 | 26.94 | 26.94 | 26.94 | — | 26.94 | 26.94 | 26.94 |
| (3) | $\theta gF + 0.00162 \times vd$ | 0.6488 | 0.6488 | 0.6488 | 0.6488 | — | 0.6488 | 0.6488 | 0.6488 |
| (4B) | fGB/fB | 0.6776 | 0.8865 | 0.5335 | 0.4844 | — | −0.8513 | 0.9355 | −0.7544 |
| (5B) | $\Sigma(\theta gFbj/fbj) \times fGB$ | 0.5437 | 0.5572 | 0.5194 | 0.5498 | — | −0.0756 | −0.1389 | 0.2805 |
| (6) | θvnf | 0.587 | 0.581 | 0.589 | 0.594 | 0.595 | 0.595 | 0.595 | 0.595 |

Figure 17:
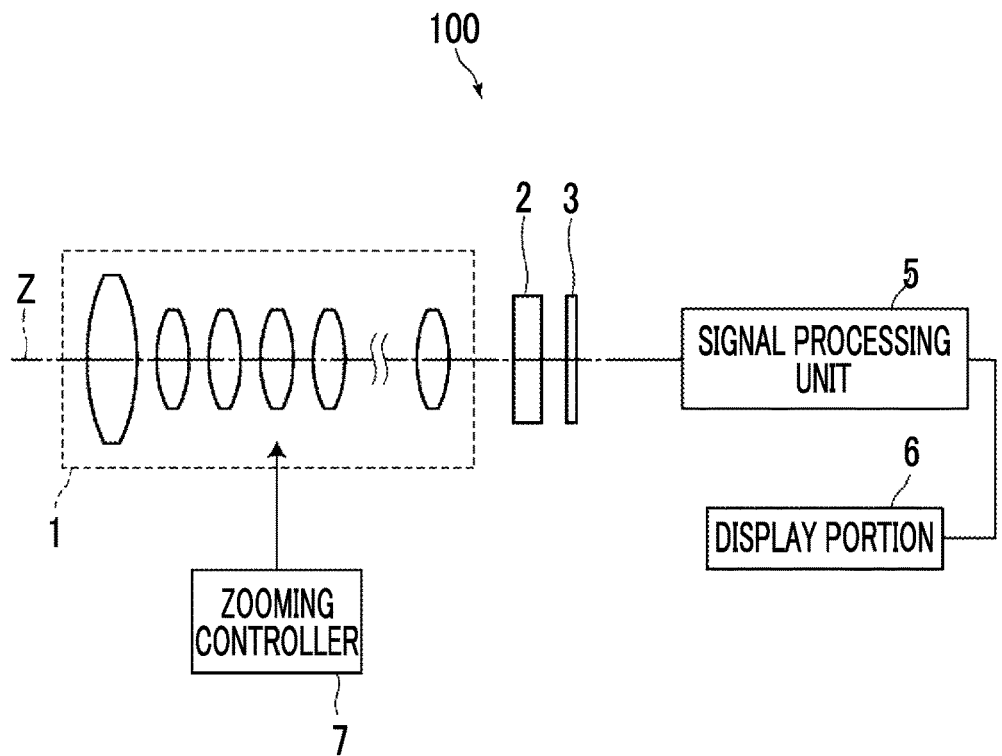
FIG. 17 is a schematic configuration diagram of an optical apparatus according to an embodiment of the present invention.

Next, an optical apparatus according to an embodiment of the present invention will be described. FIG. 17 shows a schematic configuration diagram of an optical apparatus 100 using a variable magnification optical system 1 according to an embodiment of the present invention, as an example of an optical apparatus according to an embodiment of the present invention. An example of the optical apparatus 100 includes a broadcast camera, a motion-picture camera, a video camera, a surveillance camera, or the like.

The optical apparatus 100 includes the variable magnification optical system 1, a filter 2 disposed on the image side of the variable magnification optical system 1, and an imaging element 3 disposed on the image side of the filter 2. Meanwhile, in FIG. 17, a plurality of lenses included in the variable magnification optical system 1 are schematically shown.

The imaging element 3 is used to convert an optical image formed by the variable magnification optical system 1 into an electrical signal, and can have, for example, a charge coupled device (CCD), a complementary metal oxide semiconductor (CMOS) or the like used thereas. The imaging element 3 is disposed so that the imaging surface thereof is coincident with the image surface of the variable magnification optical system 1.

The optical apparatus 100 includes a signal processing unit 5 that arithmetically processes an output signal from the imaging element 3, a display portion 6 that displays an image formed by the signal processing unit 5, and a changing magnification controller 7 that controls changing magnification of the variable magnification optical system 1. Meanwhile, in FIG. 17, only one imaging element 3 is shown, but the optical apparatus of the present invention may be a so-called three-plate type of optical apparatus having three imaging elements without being limited.

Figure 18:
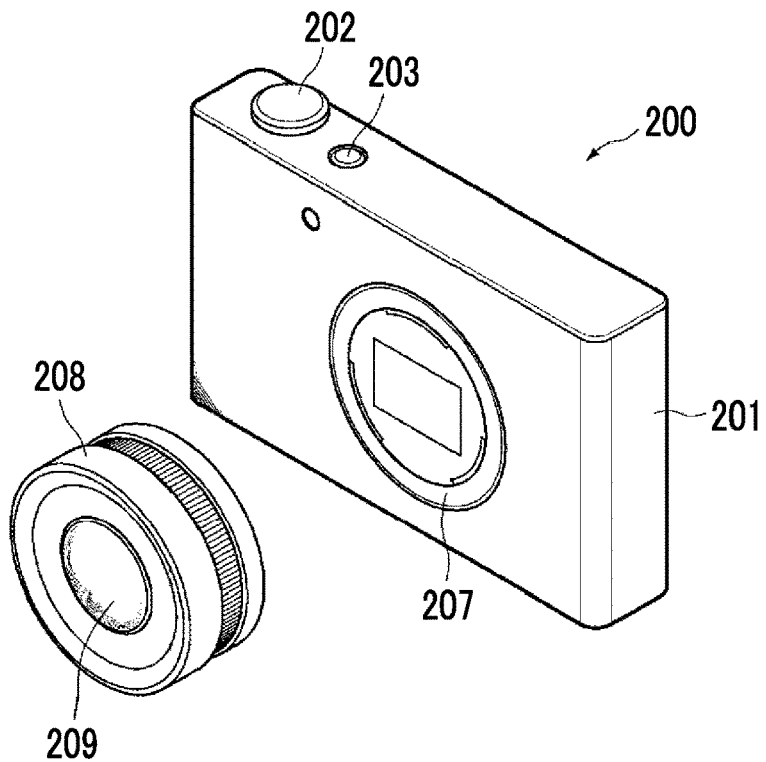
FIG. 18 is a perspective view of a front side of an optical apparatus according to another embodiment of the present invention.
Figure 19:
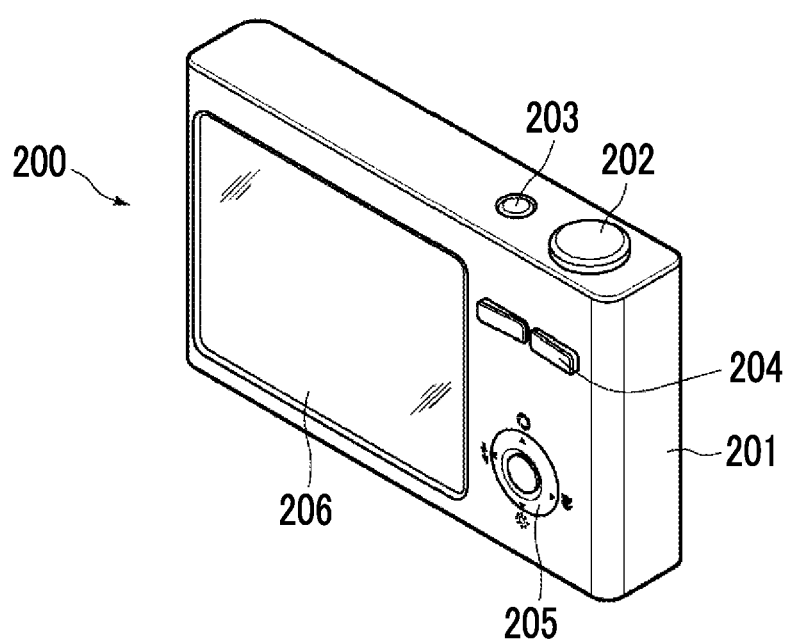
FIG. 19 is a perspective view of a rear surface side of an optical apparatus according to another embodiment of the present invention.

Next, an optical apparatus 200 according to another embodiment of the present invention will be described with reference to FIGS. 18 and 19. The optical apparatus 200 showing perspective shapes of a front side and a rear surface side, respectively, in FIGS. 18 and 19 is a single-lens digital camera, having no reflex finder, which has an interchangeable lens 208 detachably mounted therein. The interchangeable lens 208 has a variable magnification optical system 209 which is an optical system according to an embodiment of the present invention housed within a lens barrel.

This optical apparatus 200 includes a camera body 201, and is provided with a shutter button 202 and a power button 203 on the upper surface of the camera body 201. In addition, an operating portion 204, an operating portion 205, and a display portion 206 are provided on the rear surface of the camera body 201. The display portion 206 is used for displaying a captured image and an image within an angle of view before image capture.

An imaging aperture on which light from an imaging target is incident is provided on the front central portion of the camera body 201, a mount 207 is provided at a position corresponding to the imaging aperture, and the interchangeable lens 208 is mounted onto the camera body 201 through this mount 207.

The camera body 201 is provided therein with an imaging element (not shown) such as a CCD or a CMOS that outputs an imaging signal according to a subject image formed by the interchangeable lens 208, a signal processing circuit (not shown) that processes the imaging signal which is output from the imaging element to generate an image, a recording medium (not shown) for recording the generated image, and the like. In this optical apparatus 200, a still image or a motion picture can be captured by pressing the shutter button 202, and image data obtained by this image capture is recorded in the recording medium.

Hereinbefore, the present invention has been described through embodiments and examples, but the present invention is not limited to the above-described embodiments and examples, and can be variously modified. For example, values such as the curvature radius, the surface distance, the refractive index, and the Abbe number of each lens are not limited to the values shown in each of the above-described numerical value examples, and other values can be used therefor.

In addition, the optical apparatus according to an embodiment of the present invention is also not limited to the above examples, and can be replaced with various aspects such as, for example, a single-lens reflex camera, a film camera, and a projector.

What is claimed is:

1. A variable magnification optical system comprising, in order from an object side toward an image side:
a first lens group having a positive refractive power which is disposed at a position closest to the object side;
a variable magnification lens group which is disposed at a position closest to the object side among lens groups having a negative refractive power and moves during changing magnification;

an intermediate group including at least one lens group; and a final lens group having a positive refractive power which is disposed at a position closest to the image side, wherein the variable magnification lens group, the intermediate group, the final lens group are continuously disposed in an uninterrupted order, distances between all adjacent lens groups within the variable magnification optical system change in directions along the optical axis during changing magnification, at least one LA lens is included which satisfies the following Conditional Expressions (1A), (2A), and (3A), and is located from the variable magnification lens group to the intermediate group, in a case where a refractive index at a d line of the LA lens is set to NdA, an Abbe number of the LA lens on the basis of the d line is set to vdA, and a partial dispersion ratio of the LA lens between a g line and an F line is set to θgFA, $$1.92 < NdA < 2.3 \quad (1A)$$

$$26 < vdA < 28.5 \quad (2A)$$

$$0.62 < \theta gFA + 0.00162 \times vdA < 0.9 \quad (3A),$$

the variable magnification lens group includes at least one negative lens and at least one positive lens, at least one negative lens is disposed closer to the object side than a positive lens, satisfies the following Conditional Expression (6) in a case where an average value of partial dispersion ratios between the g line and the F line of all the negative lenses within the variable magnification lens group disposed closer to the object side than a positive lens of the variable magnification lens group closest to the object side is set to θvnf, $$0.58 < \theta vnf < 0.8 \quad (6),$$

a lens group closest to the image side within the intermediate group includes at least one negative lens, and at least one of negative lenses within the lens group closest to the image side within the intermediate group is the LA lens.

2. The variable magnification optical system according to claim 1, further comprising at least one lens group that satisfies the following Conditional Expression (4A), in a case where a focal length of a lens group including the LA lens is set to fGA, and a focal length of the LA lens is set to fA, $$-1 < fGA/fA < 1 \quad (4A).$$

3. The variable magnification optical system according to claim 1, further comprising at least one lens group that satisfies the following Conditional Expression (5A), in a case where the total number of lenses composing a lens group including the LA lens is set to ka, a natural number from 1 to ka is set to i, a partial dispersion ratio between the g line and the F line of an i-th lens from the object side of the lens group including the LA lens is set to θgFai, a focal length of the i-th lens from the object side of the lens group including the LA lens is set to fai, and a focal length of the lens group including the LA lens is set to fGA, $$-0.5 < \sum_{i=1}^{ka} \frac{\theta gFai}{fai} \times fGA < 0.6. \quad (5A)$$

4. The variable magnification optical system according to claim 1, wherein the first lens group remains stationary with respect to an image surface during changing magnification.

5. A variable magnification optical system comprising, in order from an object side toward an image side:

a first lens group having a positive refractive power which is disposed at a position closest to the object side;

a variable magnification lens group which is disposed at a position closest to the object side among lens groups having a negative refractive power and moves during changing magnification;

an intermediate group including at least one lens group; and a final lens group having a positive refractive power which is disposed at a position closest to the image side, wherein the variable magnification lens group, the intermediate group, the final lens group are continuously disposed in an uninterrupted order, distances between all adjacent lens groups within the variable magnification optical system change in directions along the optical axis during changing magnification, at least one LB lens is included which satisfies the following Conditional Expressions (1B), (2B), and (3B), and is located from the variable magnification lens group to the final lens group in a case where a refractive index at a d line of the LB lens is set to NdB, an Abbe number of the LB lens on the basis of the d line is set to vdB, and a partial dispersion ratio of the LB lens between a g line and an F line is set to θgFB, $$1.92 < NdB < 2.3 \quad (1B)$$

$$26 < vdB < 28 \quad (2B)$$

$$0.62 < \theta gFB + 0.00162 \times vdB < 0.9 \quad (3B),$$

the final lens group includes at least one positive lens, and a positive lens of the final lens group closest to the object side of all positive lenses within the final lens group is the LB lens.

6. The variable magnification optical system according to claim 5, further comprising at least one lens group that satisfies the following Conditional Expression (4B) in a case where a focal length of a lens group including the LB lens is set to fGB, and a focal length of the LB lens is set to fB, $$-1 < fGB/fB < 1 \quad (4B).$$

7. The variable magnification optical system according to claim 5, further comprising at least one lens group that satisfies the following Conditional Expression (5B), in a case where the total number of lenses composing a lens group including the LB lens is set to kb, a natural number from 1 to kb is set to j, a partial dispersion ratio between the g line and the F line of a j-th lens from the object side of the lens group including the LB lens is set to θgFbj, a focal length of the j-th lens from the object side of the lens group including the LB lens is set to fbj, and a focal length of the lens group including the LB lens is set to fGB, $$-0.5 < \sum_{j=1}^{kb} \frac{\theta gFbj}{fbj} \times fGB < 0.6. \tag{5B}$$

8. The variable magnification optical system according to claim 5,
wherein the variable magnification lens group includes at least one negative lens and at least one positive lens,
at least one negative lens is disposed closer to the object side than a positive lens, and
satisfies the following Conditional Expression (6) in a case where an average value of partial dispersion ratios between the g line and the F line of all the negative lenses within the variable magnification lens group disposed closer to the object side than a positive lens of the variable magnification lens group closest to the object side is set to θvnf, $$0.58 < \theta vnf < 0.8 \tag{6}$$

9. The variable magnification optical system according to claim 5,
wherein the first lens group remains stationary with respect to an image surface during changing magnification.

10. An optical apparatus comprising the variable magnification optical system according to claim 1.

11. An optical apparatus comprising the variable magnification optical system according to claim 5.

* * * * *